United States Patent
Ueda et al.

(10) Patent No.: US 9,200,884 B2
(45) Date of Patent: Dec. 1, 2015

(54) MAGNETIC SENSOR SYSTEM INCLUDING THREE DETECTION CIRCUITS

(71) Applicant: TDK CORPORATION, Tokyo (JP)

(72) Inventors: Kunihiro Ueda, Tokyo (JP); Hiraku Hirabayashi, Tokyo (JP); Satoshi Abe, Tokyo (JP); Homare Tokida, Tokyo (JP)

(73) Assignee: TDK CORPORATION, Tokyo (JP)

( * ) Notice: Subject to any disclaimer, the term of this patent is extended or adjusted under 35 U.S.C. 154(b) by 171 days.

(21) Appl. No.: 14/164,315

(22) Filed: Jan. 27, 2014

(65) Prior Publication Data

US 2014/0292313 A1   Oct. 2, 2014

(30) Foreign Application Priority Data

Mar. 29, 2013   (JP) .................. 2013-073686

(51) Int. Cl.
  *G01B 7/14*   (2006.01)
  *G01B 7/30*   (2006.01)

(52) U.S. Cl.
  CPC ... *G01B 7/14* (2013.01); *G01B 7/30* (2013.01)

(58) Field of Classification Search
  CPC .................................. G01B 7/14; G01R 33/09
  USPC ..................................................... 324/207.21
  See application file for complete search history.

(56) References Cited

U.S. PATENT DOCUMENTS

| | | | |
|---|---|---|---|
| 6,924,639 B2 | 8/2005 | Uenoyama | |
| 7,078,892 B2 | 7/2006 | Kurumado | |
| 2011/0291646 A1* | 12/2011 | Musha | G01D 5/2457 324/207.11 |
| 2012/0038359 A1* | 2/2012 | Saruki | G01R 33/093 324/252 |

FOREIGN PATENT DOCUMENTS

| | | |
|---|---|---|
| EP | 2 546 611 A1 | 1/2013 |
| JP | S58-92819 A | 6/1983 |
| JP | A-4-5571 | 1/1992 |
| JP | H10-274530 A | 10/1998 |
| JP | A-2009-133751 | 6/2009 |

(Continued)

OTHER PUBLICATIONS

Nov. 11, 2014 Japanese Office Action issued in Japanese Application No. 2013-073686.

(Continued)

*Primary Examiner* — Tung X Nguyen
*Assistant Examiner* — Zannatul Ferdous
(74) *Attorney, Agent, or Firm* — Oliff PLC

(57) ABSTRACT

A magnetic sensor system includes a scale and a magnetic sensor arranged in a relative positional relationship variable in a first direction, and a computing unit. The magnetic sensor includes a first detection circuit, a second detection circuit and a third detection circuit that are disposed at a first position, a second position and a third position, respectively. Each of the first to third detection circuits includes a spin-valve MR element. A difference between two of the first to third positions that are the most distant from each other in a first direction falls within a one-pitch amount of change in the relative positional relationship between the scale and the magnetic sensor. The computing unit generates first and second post-computation signals having mutually different phases by computation using detection signals from the first to third detection circuits.

8 Claims, 15 Drawing Sheets

(56) References Cited

FOREIGN PATENT DOCUMENTS

| WO | WO 2007/055135 A1 | 5/2007 |
| WO | WO 2011/111494 A1 | 9/2011 |

OTHER PUBLICATIONS

Office Action issued in Japanese Patent Application No. 2013-073686 mailed Mar. 25, 2014 (with translation).

* cited by examiner

MAGNETIC SENSOR SYSTEM INCLUDING THREE DETECTION CIRCUITS

BACKGROUND OF THE INVENTION

1. Field of the Invention

The present invention relates to a magnetic sensor system for detecting a physical quantity associated with the relative positional relationship between a scale and a magnetic sensor.

2. Description of the Related Art

In recent years, sensor systems such as rotary encoders and linear encoders have been employed to detect a physical quantity associated with the rotational movement or linear movement of a moving object in a variety of applications. Such sensor systems typically include a scale and a sensor, and the sensor is configured to generate a signal associated with the relative positional relationship between the scale and the sensor. Among such sensor systems, one that uses a magnetic sensor as the sensor will be called herein "magnetic sensor system". Magnetic sensor systems are disclosed in, for example, JP-H04-5571 A, U.S. Pat. No. 6,924,639 B2, and U.S. Pat. No. 7,078,892 B2.

The scale of the magnetic sensor system for use with a rotationally moving object is, in general, a rotating body that moves in response to the movement of the moving object. The rotating body can be, for example, a multipole-magnetized magnet having a plurality of pairs of N and S poles alternately arranged in a circumferential direction, or a gear having teeth formed of a magnetic material. In this case, the magnetic sensor system detects, for example, the rotational position and/or the rotational speed of the rotating body as the physical quantity.

The scale of the magnetic sensor system for use with a linearly moving object is, for example, a linear scale having a plurality of pairs of N and S poles arranged alternately in a linear configuration. In such a case, one of the linear scale and the magnetic sensor moves in response to the movement of the moving object, and the magnetic sensor system detects the relative position and/or speed of the linear scale with respect to the magnetic sensor as the physical quantity.

In the magnetic sensor system, continuous changes in the relative positional relationship between the scale and the magnetic sensor cause periodic changes in the direction of a magnetic field at a certain point in the magnetic sensor. Herein, the amount of a change in the relative positional relationship between the scale and the magnetic sensor that changes the direction of the magnetic field at a certain point by one period is referred to as one pitch.

Some known rotary encoders and linear encoders are configured so that the sensor includes first and second detection units disposed at mutually different positions and the two detection units generate a first signal and a second signal that have mutually different phases. This configuration makes it possible to detect the direction of relative movement of the scale with respect to the sensor by determining whether the phase of the second signal is advanced or delayed with respect to the phase of the first signal.

Now, a description will be given concerning the problem to be raised when the magnetic sensor system is configured so that the magnetic sensor includes the first and second detection units mentioned above. In this case, each of the first and second detection units includes a magneto-sensitive element. As disclosed in U.S. Pat. No. 6,924,639 B2 and U.S. Pat. No. 7,078,892 B2, many of conventional magnetic sensor systems employ an anisotropic magnetoresistive element as the magneto-sensitive element. The anisotropic magnetoresistive element requires a relatively large footprint. Thus, to employ the anisotropic magnetoresistive element as the magneto-sensitive element, the distance between the first detection unit and the second detection unit must be large to some extent. This leads to the problem that the first detection unit and the second detection unit tend to have mutually different detection characteristics due to the following various factors. One factor is that the first detection unit and the second detection unit may be subjected to mutually different noise magnetic fields. Another factor is that the physical distance between the first detection unit and the scale may differ from the physical distance between the second detection unit and the scale. Still another factor is that the effective distance between the first detection unit and the scale may differ from the effective distance between the second detection unit and the scale due to, for example, adhesion of magnetic metal powder to the scale.

Further, in the case of the anisotropic magnetoresistive element, a decrease in the magnitude of one pitch would make it difficult to accurately detect a change in the magnetic field caused by a change in the relative positional relationship between the scale and the magnetic sensor.

JP-1104-5571 A discloses a rotation detector including: a rotating magnet having only a pair of N and S poles; first to third magnetoresistive elements disposed at intervals of 120° on the same circumference about the rotation axis of the magnet; a first differential operational amplifier for computing the difference between the output of the first magnetoresistive element and the output of the third magnetoresistive element; and a second differential operational amplifier for computing the difference between the output of the second magnetoresistive element and the output of the third magnetoresistive element.

The above-described problem holds true for this rotation detector because the positions of the first to third magnetoresistive elements are significantly different from each other. Further, since the first to third magnetoresistive elements are large, it is difficult to apply the technique disclosed in JP-H04-5571 A to a magnetic sensor system that uses, as the scale, a multipole-magnetized magnet having a plurality of pairs of N and S poles arranged alternately in a circumferential direction.

As can be seen from the foregoing, heretofore there have not been provided any magnetic sensor system that allows a change in the relative positional relationship between the scale and the magnetic sensor by two pitches or more and that is able to detect, with high accuracy, a physical quantity associated with the relative positional relationship between the scale and the magnetic sensor, including the direction of relative movement of the scale with respect to the magnetic sensor.

OBJECT AND SUMMARY OF THE INVENTION

It is an object of the present invention to provide a magnetic sensor system that allows a change in the relative positional relationship between the scale and the magnetic sensor by two pitches or more and that is able to detect, with high accuracy, a physical quantity associated with the relative positional relationship between the scale and the magnetic sensor, including the direction of relative movement of the scale with respect to the magnetic sensor.

A magnetic sensor system of the present invention includes a scale and a magnetic sensor that are arranged in a relative positional relationship variable in a first direction, and is configured to detect a physical quantity associated with the relative positional relationship between the scale and the magnetic sensor. In the magnetic sensor system of the present invention, the magnetic sensor includes a first detection circuit disposed at a first position, a second detection circuit disposed at a second position, and a third detection circuit disposed at a third position. The first detection circuit outputs a first detection signal that varies depending on a first magnetic field applied to the first detection circuit. The second detection circuit outputs a second detection signal that varies depending on a second magnetic field applied to the second detection circuit. The third detection circuit outputs a third detection signal that varies depending on a third magnetic field applied to the third detection circuit. Each of the first to third detection circuits includes a magnetoresistive element. The magnetoresistive element includes: a magnetization pinned layer having a magnetization in a pinned direction; a free layer having a magnetization that varies depending on an applied magnetic field; and a nonmagnetic layer interposed between the magnetization pinned layer and the free layer.

Each of the first to third magnetic fields changes its direction periodically in response to a change in the relative positional relationship between the scale and the magnetic sensor. The relative positional relationship between the scale and the magnetic sensor is changeable by two pitches or more, where one pitch is an amount of a change in the relative positional relationship between the scale and the magnetic sensor that changes the direction of each of the first to third magnetic fields by one period. Two of the first to third positions that are the most distant from each other in the first direction are different from each other by one pitch or less in the first direction. The first to third detection signals change periodically in response to a change in the relative positional relationship between the scale and the magnetic sensor, and have mutually different phases. The magnetic sensor system further includes a computing unit that generates a first post-computation signal by computation using at least the first detection signal and the third detection signal and generates a second post-computation signal by computation using at least the second detection signal and the third detection signal. The first post-computation signal and the second post-computation signal change periodically in response to a change in the relative positional relationship between the scale and the magnetic sensor, and have mutually different phases.

In the magnetic sensor system of the present invention, two of the first to third positions that are the most distant from each other in the first direction may be different from each other by ½ pitch or less in the first direction.

In the magnetic sensor system of the present invention, the first post-computation signal may be generated by computation including determining the difference between the first detection signal and the third detection signal, and the second post-computation signal may be generated by computation including determining the difference between the second detection signal and the third detection signal.

In the magnetic sensor system of the present invention, the scale may be a rotating body that rotates about a predetermined central axis. In such a case, the rotation of the rotating body changes the relative positional relationship between the scale and the magnetic sensor. The first direction is the direction of rotation of the rotating body. The one pitch is expressed in an angle in the direction of rotation of the rotating body.

The rotating body may have a plurality of pairs of N and S poles alternately arranged in a circumferential direction. In such a case, each of the first to third magnetic fields is produced by the rotating body and changes its direction as the rotating body rotates. The one pitch is the angle formed by two straight lines that connect the central axis to centers of two adjacent N poles of the rotating body.

The rotating body may be a gear having teeth formed of a magnetic material. The magnetic sensor system may further include a magnet having a fixed positional relationship with the magnetic sensor. In such a case, each of the first to third magnetic fields is produced by the magnet and changes its direction as the gear rotates. The one pitch is the angle formed by two straight lines that connect the central axis to centers of two adjacent teeth.

In the magnetic sensor system of the present invention, the scale may have a plurality of pairs of N and S poles arranged alternately in a linear configuration. In such a case, the first direction is the direction in which the N and S poles of the scale are arranged. Each of the first to third magnetic fields is produced by the scale. The one pitch is the distance between centers of two adjacent N poles of the scale.

In the magnetic sensor system of the present invention, the nonmagnetic layer of the magnetoresistive element may be a tunnel barrier layer.

In the magnetic sensor system of the present invention, each of the first to third detection circuits includes a so-called spin-valve magnetoresistive element, that is, a magnetoresistive element including a magnetization pinned layer, a free layer and a nonmagnetic layer. The spin-valve magnetoresistive element allows for a significant reduction in footprint when compared with the anisotropic magnetoresistive element. The present invention thus makes it possible that, in the magnetic sensor system in which the relative positional relationship between the scale and the magnetic sensor is changeable by two pitches or more, the first to third detection circuits are disposed such that two of the first to third positions that are the most distant from each other in the first direction are different from each other by one pitch or less in the first direction. Further, the first and second post-computation signals of the present invention allow for accurate detection of a physical quantity associated with the relative positional relationship between the scale and the magnetic sensor, including the direction of relative movement of the scale with respect to the magnetic sensor. Consequently, the present invention makes it possible to accurately detect a physical quantity associated with the relative positional relationship between the scale and the magnetic sensor, including the direction of relative movement of the scale with respect to the magnetic sensor, for the magnetic sensor system in which the relative positional relationship between the scale and the magnetic sensor is changeable by two pitches or more.

Other and further objects, features and advantages of the present invention will appear more fully from the following description.

DETAILED DESCRIPTION OF THE PREFERRED EMBODIMENTS

First Embodiment

Figure 1:
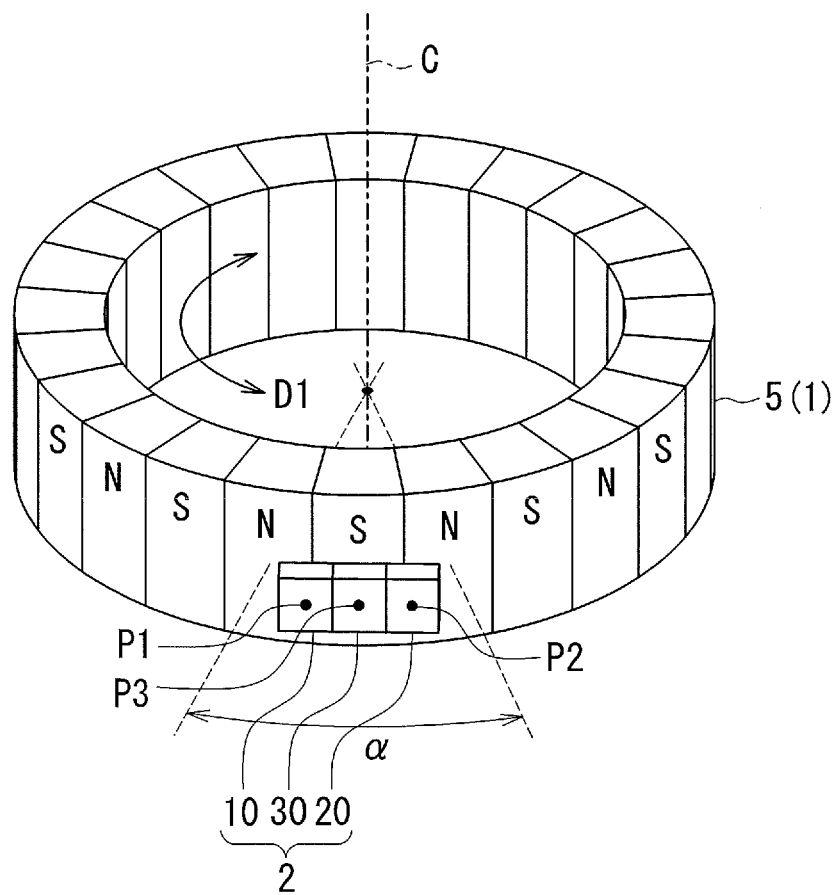
FIG. 1 is a perspective view illustrating the general configuration of a magnetic sensor system according to a first embodiment of the invention.
Figure 2:
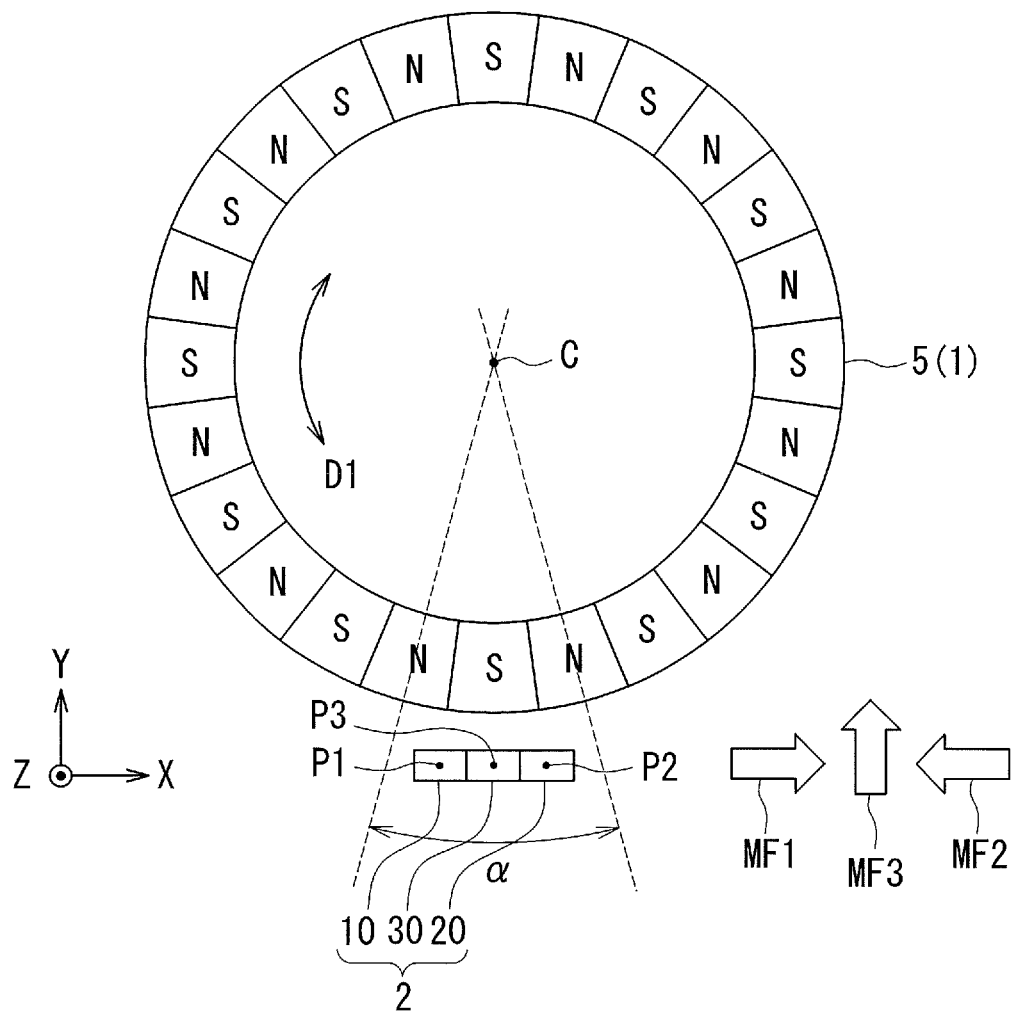
FIG. 2 is a plan view illustrating the general configuration of the magnetic sensor system according to the first embodiment of the invention.
Figure 3:
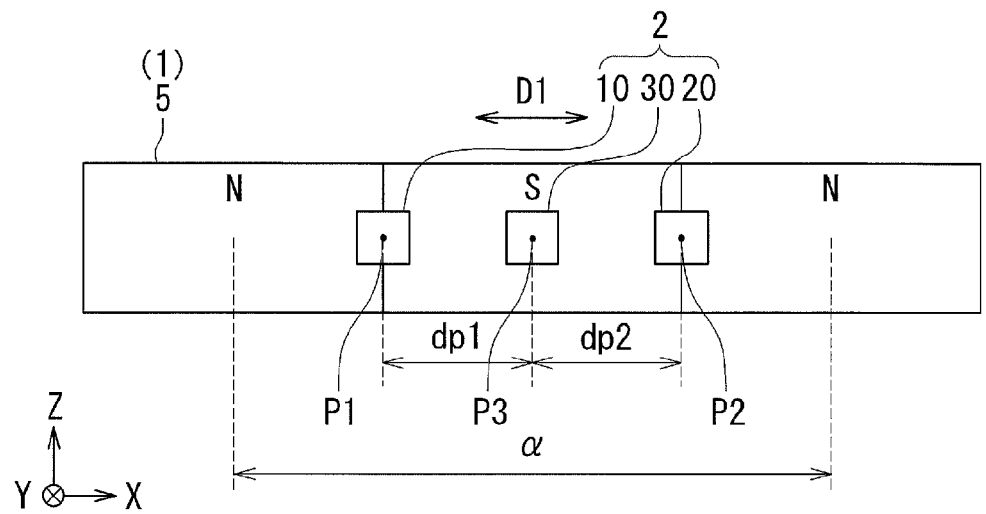
FIG. 3 is a side view illustrating a scale and first to third detection circuits of the first embodiment of the invention.

Preferred embodiments of the present invention will now be described in detail with reference to the drawings. First, reference is made to FIG. 1 to FIG. 3 to describe the general configuration of a magnetic sensor system according to a first embodiment of the invention. FIG. 1 is a perspective view illustrating the general configuration of the magnetic sensor system according to the first embodiment. FIG. 2 is a plan view illustrating the general configuration of the magnetic sensor system according to the first embodiment. FIG. 3 is a side view illustrating a scale and first to third detection circuits of the first embodiment.

As shown in FIG. 1 to FIG. 3, the magnetic sensor system according to the first embodiment includes a scale 1 and a magnetic sensor 2 that are arranged in a relative positional relationship variable in a first direction D1, and is configured to detect a physical quantity associated with the relative positional relationship between the scale 1 and the magnetic sensor 2. The scale 1 of the first embodiment is a rotating body that rotates about a predetermined central axis C in response to the movement of a rotationally moving object (not illustrated). The rotation of the rotating body changes the relative positional relationship between the scale 1 and the magnetic sensor 2. The first direction D1 is the direction of rotation of the rotating body. The magnetic sensor system detects, for example, the rotational position and/or the rotational speed of the rotating body as the physical quantity.

As shown in FIG. 1 and FIG. 2, the rotating body of the first embodiment is a multipole-magnetized magnet 5 having a plurality of pairs of N and S poles alternately arranged in a circumferential direction. In the example shown in FIG. 1 and FIG. 2, the magnet 5 has 12 pairs of N and S poles. The magnetic sensor 2 is disposed to face the outer circumferential surface of the magnet 5.

Now, the definition of directions in the first embodiment will be described with reference to FIG. 1 and FIG. 2. First, the direction parallel to the central axis C shown in FIG. 1 and from bottom to top in FIG. 1 is defined as the Z direction. In FIG. 2, the Z direction is shown as the direction out of the plane of FIG. 2. Next, two directions that are perpendicular to the Z direction and orthogonal to each other are defined as the X direction and the Y direction. In FIG. 2, the X direction is shown as the rightward direction, and the Y direction is shown as the upward direction. Further, the direction opposite to the X direction is defined as the −X direction, and the direction opposite to the Y direction is defined as the −Y direction.

The magnetic sensor 2 includes a first detection circuit 10, a second detection circuit 20 and a third detection circuit 30. To facilitate understanding, in FIG. 1 and FIG. 2 the first to third detection circuits 10, and 30 are depicted as being larger compared to those in FIG. 3. Further, although the first to third detection circuits 10, 20 and 30 are depicted as separate components in FIG. 1, they may be integrated into a single component.

The first detection circuit 10 is disposed at a first position P1, detects a first magnetic field MF1 applied to the first detection circuit 10, and outputs a first detection signal S1 that varies depending on the first magnetic field MF1. The second detection circuit 20 is disposed at a second position P2, detects a second magnetic field MF2 applied to the second detection circuit 20, and outputs a second detection signal S2 that varies depending on the second magnetic field MF2. The third detection circuit 30 is disposed at a third position P3, detects a third magnetic field MF3 applied to the third detection circuit 30, and outputs a third detection signal S3 that varies depending on the third magnetic field MF3. In FIG. 1 to FIG. 3, the first position P1 is shown as the position of the center of the first detection circuit 10, the second position P2 is shown as the position of the center of the second detection circuit 20, and the third position P3 is shown as the position of the center of the third detection circuit 30.

The first to third positions P1 to P3 are different from each other in the first direction D1 and the X direction. In the example shown in FIG. 2 and FIG. 3, a straight line that connects the third position P3 and the central axis C is parallel to the Y direction. The first to third positions P1 to P3 are the same in the Y direction and the Z direction. In the example shown in FIG. 2 and FIG. 3, the first to third positions P1 to P3 are arranged in the order of the first position P1, the third position P3 and the second position P2 in the X direction. In the present invention, however, the order of arrangement of the positions P1 to P3 is not limited to this example.

Each of the first to third magnetic fields MF1 to MF3 changes its direction periodically in response to a change in the relative positional relationship between the scale 1 and the magnetic sensor 2. In the first embodiment, each of the first to third magnetic fields MF1 to MF3 is produced by the magnet 5 and changes its direction as the rotating body or the magnet 5 rotates. In FIG. 2, the hollow arrows MF1, MF2 and MF3 indicate the directions of the first magnetic field MF1, the second magnetic field MF2 and the third magnetic field MF3, respectively, when the relative positional relationship between the scale 1 and the magnetic sensor 2 is as shown in FIG. 2. The direction of the first magnetic field MF1 rotates about the first position P1 in the XY plane. The direction of the second magnetic field MF2 rotates about the second position P2 in the XY plane. The direction of the third magnetic field MF3 rotates about the third position P3 in the XY plane.

Herein, the amount of a change in the relative positional relationship between the scale 1 and the magnetic sensor 2 that changes the direction of each of the first to third magnetic fields MF1 to MF3 by one period is defined as one pitch. In the first embodiment, one pitch is expressed in an angle in the direction of rotation of the rotating body or the magnet 5. Specifically, one pitch is the angle formed by two straight lines that connect the central axis C to the centers of two adjacent N poles of the magnet 5. In FIG. 1 and FIG. 2, the aforementioned two straight lines are shown in broken lines and the angle formed by the two straight lines is denoted by symbol $\alpha$. In the example shown in FIG. 1 and FIG. 2, the angle $\alpha$ is 30°. In this example, one rotation of the magnet 5 causes the direction of each of the first to third magnetic fields MF1 to MF3 to rotate 12 times, that is, to change by 12 periods, and causes the relative positional relationship between the scale 1 and the magnetic sensor 2 to change by 12 pitches. Thus, the relative positional relationship between the scale 1 and the magnetic sensor 2 is changeable by two pitches or more.

In the first embodiment, two of the first to third positions P1 to P3 that are the most distant from each other in the first direction D1 are different from each other by one pitch or less, preferably by ½ pitch or less, in the first direction D1.

In the first embodiment, the difference between any two of the first to third positions P1 to P3 in the first direction D1, which will hereinafter be referred to as the positional difference, is defined by an angle in the direction of rotation of the rotating body or the magnet 5, the angle being formed by two straight lines that connect the central axis C to the two positions. In FIG. 3, the positional difference between the first position P1 and the third position P3 is denoted by symbol dp1, and the positional difference between the second position P2 and the third position P3 is denoted by symbol dp2. In the example shown in FIG. 3, the positional differences dp1 and dp2 are both ¼ of the angle $\alpha$, that is, ¼ pitch. In consideration of the production accuracy of the magnetic sensor system and other factors, the positional differences dp1 and dp2 may slightly deviate from ¼ pitch.

In the example shown in FIG. 1 to FIG. 3, two of the first to third positions P1 to P3 that are the most distant from each other in the first direction D1 are the first position P1 and the second position P2. In this example, the positional difference between the first position P1 and the second position P2 in the first direction D1 is ½ of the angle $\alpha$, that is, ½ pitch.

Each of the first to third detection circuits 10, 20 and 30 includes a magnetoresistive (MR) element. As will be described in detail later, all the MR elements included in the first to third detection circuits 10, 20 and 30 of the first embodiment are spin-valve MR elements. Each MR element includes a magnetization pinned layer having a magnetization in a pinned direction, a free layer having a magnetization that varies depending on an applied magnetic field, and a nonmagnetic layer interposed between the magnetization pinned layer and the free layer. Each of the first to third detection circuits 10, 20 and 30 is disposed such that the plane of the layers constituting each MR element included therein is perpendicular to a straight line connecting the third position P3 and the central axis C.

Assume that the distance between the centers of two adjacent N poles along the outer circumferential surface of the magnet 5 is 4 mm. In this case, in order to allow the positional difference between the first position P1 and the second position P2 to fall within one pitch, it is required in the first embodiment that the distance between the first position P1 and the third position P3, herein called the first distance, be 2 mm or less, the distance between the second position P2 and the third position P3, herein called the second distance, be 2 mm or less, and the distance between the first position P1 and the second position P2, herein called the third distance, be 4 mm or less. In the first embodiment, it is particularly required that each of the first and second distances be 1 mm or less and the third distance be 2 mm or less. Spin-valve MR elements allow for a significant reduction in footprint when compared with anisotropic magnetoresistive elements. Thus, the first embodiment allows the first to third detection circuits 10, 20 and 30 to be disposed such that the first to third positions P1 to P3 satisfy the above-described requirements, as long as the magnitude of one pitch or the distance between the centers of two adjacent N poles falls within a practical range. The first embodiment consequently makes it possible that, in the magnetic sensor system in which the relative positional relationship between the scale 1 and the sensor 2 is changeable by two pitches or more, the first to third detection circuits 10, 20 and 30 are disposed such that the positional difference between the two positions P1 and P2 which are the most distant from each other in the first direction D1 among the first to third positions P1 to P3 falls within one pitch.

The first to third detection signals S1 to S3 change periodically in response to a change in the relative positional relationship between the scale 1 and the magnetic sensor 2, and have mutually different phases. In the example shown in FIG. 1 and FIG. 2, one period of the first to third detection signals S1 to S3, i.e., an electrical angle of 360°, is equivalent to a 1/12 rotation of the magnet 5, i.e., a 30-degree angle of rotation of the magnet 5.

The magnetic sensor system further includes a computing unit 40 that generates a first post-computation signal by computation using at least the first detection signal S1 and the third detection signal S3 and generates a second post-computation signal by computation using at least the second detection signal S2 and the third detection signal S3. The first post-computation signal and the second post-computation signal change periodically in response to a change in the relative positional relationship between the scale 1 and the magnetic sensor 2, and have mutually different phases. The computation for generating the first post-computation signal may include determining the difference between the first detection signal S1 and the third detection signal S3. The computation for generating the second post-computation signal may include determining the difference between the second detection signal S2 and the third detection signal S3.

Figure 4:
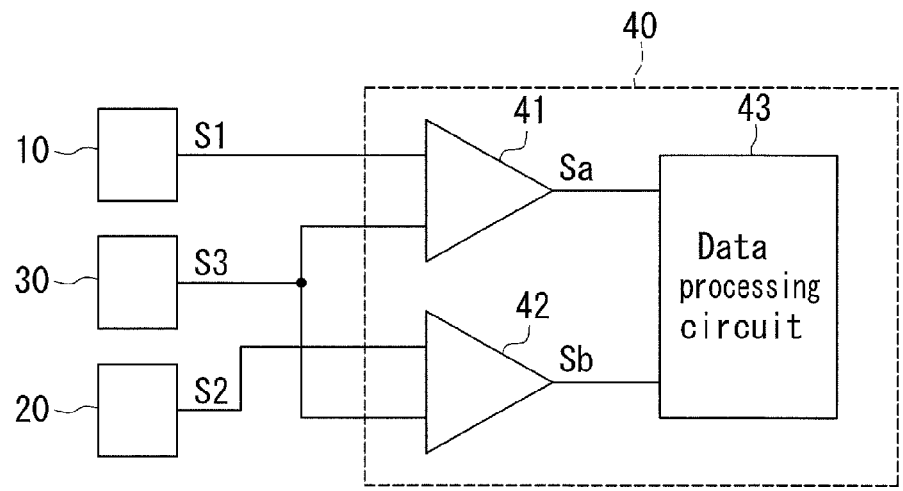
FIG. 4 is a block diagram illustrating the circuit configuration of the magnetic sensor system according to the first embodiment of the invention.

The configuration of the computing unit 40 will now be described with reference to FIG. 4. FIG. 4 is a block diagram illustrating the circuit configuration of the magnetic sensor system according to the first embodiment. The computing unit 40 includes two computing circuits 41 and 42 and a data processing circuit 43. Each of the computing circuits 41 and 42 has two inputs and an output. The two inputs of the computing circuit 41 are respectively connected to the first detection circuit 10 and the third detection circuit 30. The two inputs of the computing circuit 42 are respectively connected to the second detection circuit 20 and the third detection circuit 30. The computing circuit 41 is to perform computations using the first and third detection signals S1 and S3. The computing circuit 42 is to perform computations using the second and third detection signals S2 and S3.

The data processing circuit 43 has two inputs. The two inputs of the data processing circuit 43 are respectively connected to the output of the computing circuit 41 and the output of the computing circuit 42. The data processing circuit 43 is to perform computations using the output signals from the computing circuits 41 and 42 and to determine, on the basis of the computation results, the amount and/or speed of a change in the relative positional relationship between the scale 1 and the magnetic sensor 2, that is, the rotational position and/or the rotational speed of the rotating body or the magnet 5. The data processing circuit 43 can be implemented by a microcomputer, for example. A detailed description will be given later concerning the computations by the computing circuits 41 and 42 and the data processing circuit 43, and concerning the first and second post-computation signals.

Figure 5:
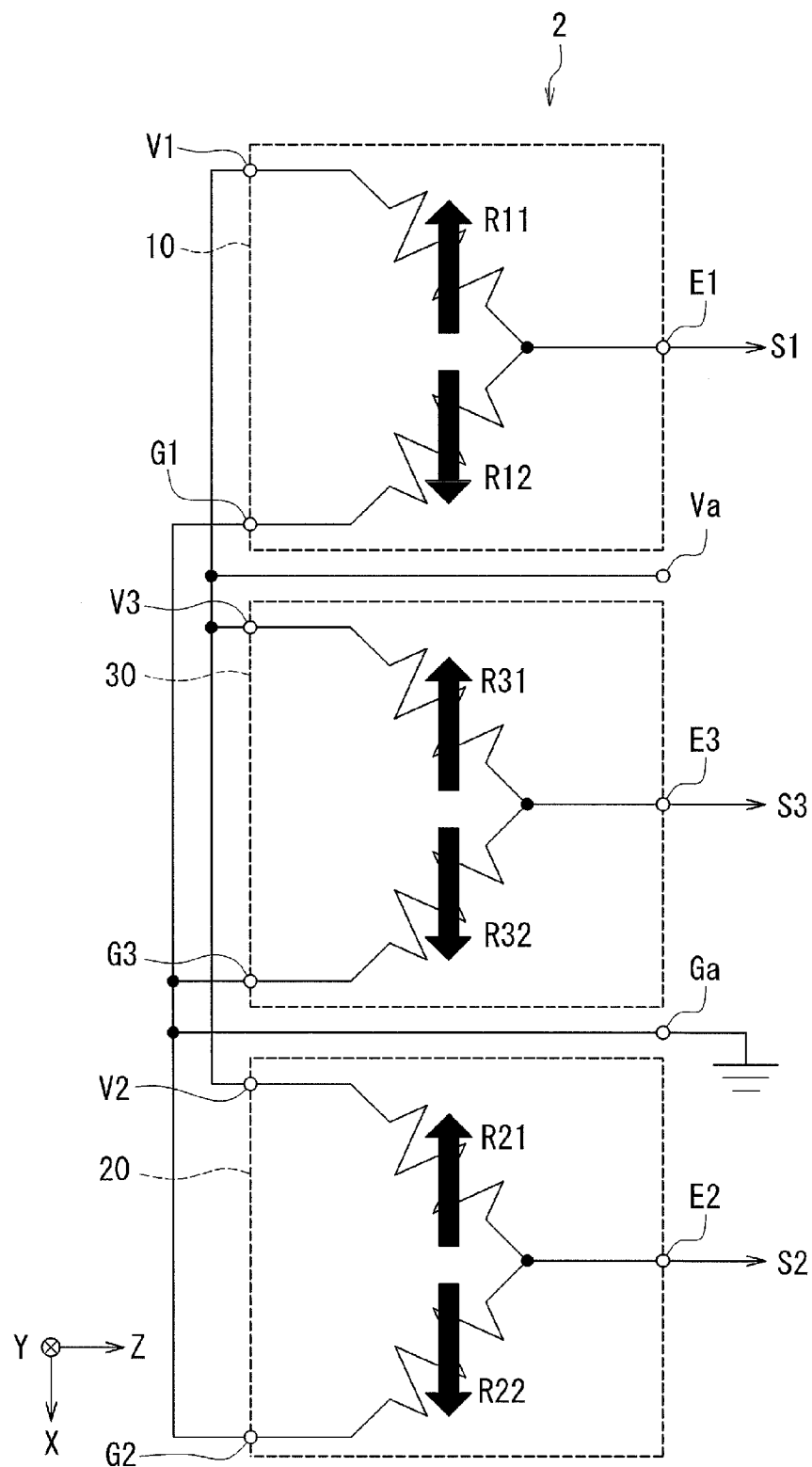
FIG. 5 is a circuit diagram illustrating the configurations of the first to third detection circuits of the first embodiment of the invention.
Figure 6:
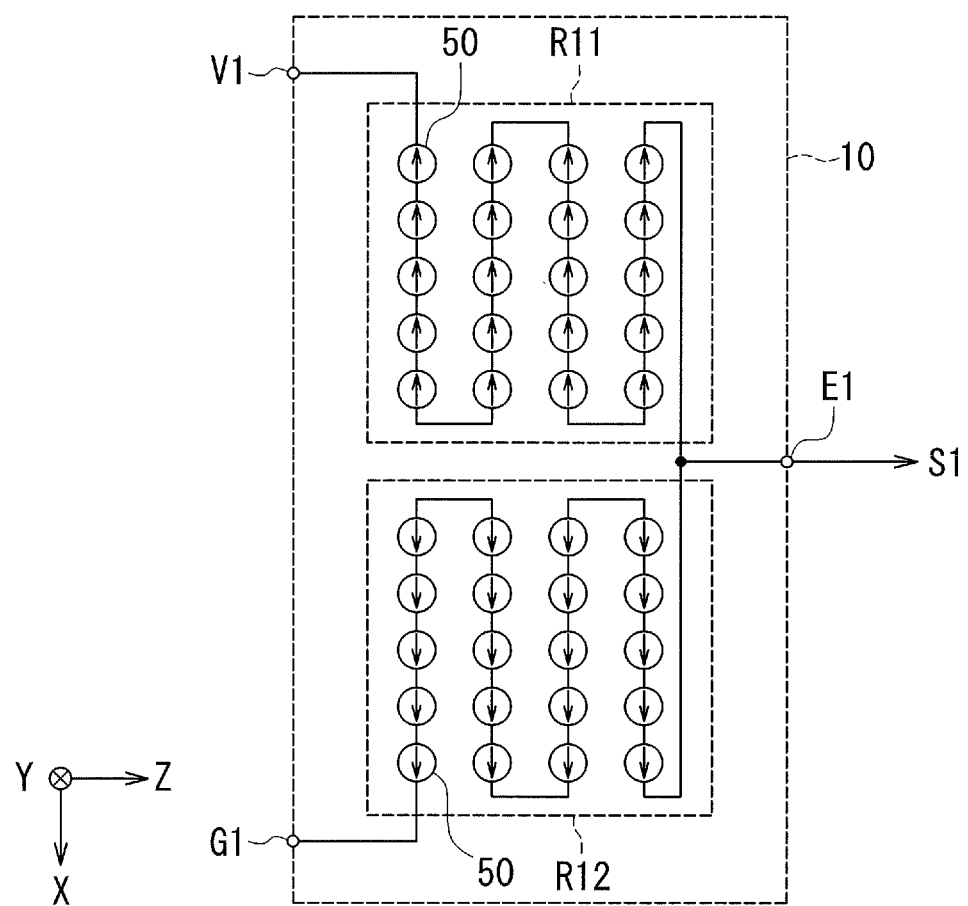
FIG. 6 is a plan view illustrating the first detection circuit of the first embodiment of the invention.

The configurations of the first to third detection circuits 10, 20 and 30 will now be described in detail with reference to FIG. 5 and FIG. 6. FIG. 5 is a circuit diagram illustrating the configurations of the first to third detection circuits 10, 20 and 30. FIG. 6 is a plan view illustrating the first detection circuit 10. The first detection circuit 10 includes MR element arrays R11 and R12 connected in series, a power supply port V1, a ground port G1, and an output port E1. Each of the MR element arrays R11 and R12 includes a plurality of MR elements 50 connected in series. A first end of the MR element array R11 is connected to the power supply port V1. A second end of the MR element array R11 is connected to a first end of the MR element array R12 and the output port E1. A second end of the MR element array R12 is connected to the ground port G1. The output port E1 outputs the first detection signal S1.

The second detection circuit 20 has a similar configuration to that of the first detection circuit 10. More specifically, the second detection circuit 20 includes MR element arrays R21 and R22 connected in series, a power supply port V2, a ground port G2, and an output port E2. Each of the MR element arrays R21 and R22 includes a plurality of MR elements 50 connected in series. A first end of the MR element array R21 is connected to the power supply port V2. A second end of the MR element array R21 is connected to a first end of the MR element array R22 and the output port E2. A second end of the MR element array R22 is connected to the ground port G2. The output port E2 outputs the second detection signal S2.

The third detection circuit 30 also has a similar configuration to that of the first detection circuit 10. More specifically, the third detection circuit 30 includes MR element arrays R31 and R32 connected in series, a power supply port V3, a ground port G3, and an output port E3. Each of the MR element arrays R31 and R32 includes a plurality of MR elements 50 connected in series. A first end of the MR element array R31 is connected to the power supply port V3. A second end of the MR element array R31 is connected to a first end of the MR element array R32 and the output port E3. A second end of the MR element array R32 is connected to the ground port G3. The output port E3 outputs the third detection signal S3.

The magnetic sensor 2 further has a power supply port Va to be supplied with a power supply voltage of a predetermined magnitude, and a ground port Ga connected to the ground. The power supply ports V1, V2 and V3 are connected to the power supply port Va. The ground ports G1, G2 and G3 are connected to the ground port Ga.

As shown in FIG. 5, the MR element arrays R11, R12, R21, R22, R31 and R32 are aligned in the X direction. The layout of the MR element arrays R11, R12, R21, R22, R31 and R32 is not limited to the example shown in FIG. 5, however.

In the first embodiment, the MR elements 50 are spin-valve MR elements each including a magnetization pinned layer, a free layer and a nonmagnetic layer. The MR elements 50 may be TMR elements or GMR elements. Where the MR elements 50 are TMR elements, the nonmagnetic layer is a tunnel barrier layer. Where the MR elements 50 are GMR elements, the nonmagnetic layer is a nonmagnetic conductive layer. In each MR element 50, the magnetization of the free layer varies depending on the magnetic field applied to the free layer. More specifically, the direction and magnitude of the magnetization of the free layer vary depending on the direction and magnitude of the magnetic field applied to the free layer. Each MR element 50 varies in resistance depending on the direction and magnitude of the magnetization of the free layer. For example, if the free layer has a magnetization of a constant magnitude, the resistance of the MR element reaches the minimum value when the magnetization direction of the free layer is the same as that of the magnetization pinned layer, and reaches the maximum value when the magnetization direction of the free layer is opposite to that of the magnetization pinned layer. In FIG. 5, the sold arrows indicate the magnetization directions of the magnetization pinned layers of the MR elements 50 in the MR element arrays R11, R12, R21, R22, R31 and R32. In FIG. 6, the arrow drawn within each MR element 50 indicates the magnetization direction of the magnetization pinned layer of the MR element 50.

In the first detection circuit 10, the magnetization pinned layers of the plurality of MR elements 50 included in the MR element array R11 are magnetized in the −X direction, and the magnetization pinned layers of the plurality of MR elements 50 included in the MR element array R12 are magnetized in the X direction. In this case, the potential at the output port E1 varies depending on the strength of a component of the first magnetic field MF1 in a direction parallel to the X and −X directions. The first detection circuit 10 thus detects the strength of the component of the first magnetic field MF1 in the direction parallel to the X and −X directions and outputs the first detection signal S1 indicative of the strength.

In the second detection circuit 20, the magnetization pinned layers of the plurality of MR elements 50 included in the MR element array R21 are magnetized in the −X direction, and the magnetization pinned layers of the plurality of MR elements 50 included in the MR element array R22 are magnetized in the X direction. In this case, the potential at the output port E2 varies depending on the strength of a component of the second magnetic field MF2 in the direction parallel to the X and −X directions. The second detection circuit 20 thus detects the strength of the component of the second magnetic field MF2 in the direction parallel to the X and −X directions and outputs the second detection signal S2 indicative of the strength.

In the third detection circuit 30, the magnetization pinned layers of the plurality of MR elements 50 included in the MR element array R31 are magnetized in the −X direction, and the magnetization pinned layers of the plurality of MR elements 50 included in the MR element array R32 are magnetized in the X direction. In this case, the potential at the output port E3 varies depending on the strength of a component of the third magnetic field MF3 in the direction parallel to the X and −X directions. The third detection circuit 30 thus detects the strength of the component of the third magnetic field MF3 in the direction parallel to the X and −X directions and outputs the third detection signal S3 indicative of the strength.

The MR element arrays R11, R21 and R31 are the same in the magnetization direction of the magnetization pinned layers of the plurality of MR elements 50 included therein. The MR element arrays R12, R22 and R32 are the same in the magnetization direction of the magnetization pinned layers of the plurality of MR elements 50 included therein. As previously mentioned, the positional difference dp1 between the first position P1 and the third position P3 is equivalent to ¼ of the angle α, that is, equivalent to an electrical angle of 90° of the first and third detection signals S1 and S3. Accordingly, the third detection signal S3 has a phase difference of 90° with respect to the first detection signal S1. Similarly, the positional difference dp2 between the second position P2 and the third position P3 is equivalent to ¼ of the angle α, that is, equivalent to an electrical angle of 90° of the second and third detection signals S2 and S3. Accordingly, the second detection signal S2 has a phase difference of 90° with respect to the third detection signal S3. Further, the positional difference between the first position P1 and the second position P2 is equivalent to ½ of the angle α, that is, equivalent to an electrical angle of 180° of the first and second detection signals S1 and S2. Accordingly, the second detection signal S2 has a phase difference of 180° with respect to the first detection signal S1.

In consideration of the production accuracy of the MR elements 50 and other factors, the magnetization pinned layers of the plurality of MR elements 50 in the first to third detection circuits 10, 20 and 30 may be magnetized in directions that are slightly different from the above-described directions.

Each of the MR element arrays R11, R12, R21, R22, R31 and R32 further includes a plurality of lower electrodes and a plurality of upper electrodes, not illustrated, for electrically connecting the plurality of MR elements 50. In each of the MR element arrays R11, R12, R21, R22, R31 and R32, the plurality of lower electrodes are arranged with spacing between every adjacent ones on a substrate (not illustrated) so as to be in a meandering configuration as a whole. Each lower electrode is shaped to be elongated in one direction. On the top surface of each lower electrode, two MR elements 50 are disposed near opposite ends in the longitudinal direction. The plurality of upper electrodes are disposed on the plurality of MR elements 50. Each upper electrode is shaped to be elongated in one direction, and electrically connects two adjacent MR elements 50 that are disposed on two lower electrodes adjacent to each other in the longitudinal direction of the lower electrodes. By such a configuration, the plurality of MR elements 50 in each of the MR element arrays R11, R12, R21, R22, R31 and R32 are connected in series via the plurality of lower and upper electrodes.

Figure 7:
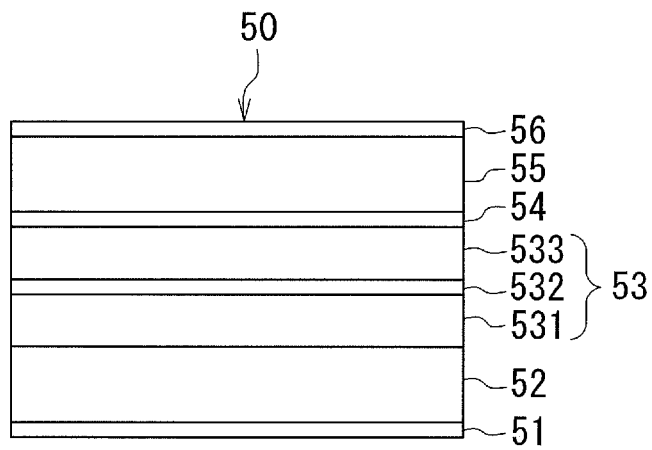
FIG. 7 is a side view of an MR element shown in FIG. 6.

An example of the configuration of each MR element 50 will now be described with reference to FIG. 7. FIG. 7 shows an MR element 50 of FIG. 6. The MR element 50 shown in FIG. 7 includes an underlayer 51, an antiferromagnetic layer 52, a magnetization pinned layer 53, a nonmagnetic layer 54, a free layer 55, and a protective layer 56 stacked in this order, the underlayer 51 being closest to the lower electrode. The underlayer 51 and the protective layer 56 are conductive. The underlayer 51 is provided for eliminating the effects of the crystal axis of the substrate (not illustrated) and to improve the crystallinity and orientability of each layer formed on the underlayer 51. The underlayer 51 may be formed of Ta or Ru, for example. The antiferromagnetic layer 52 is to pin the magnetization direction of the magnetization pinned layer 53 by means of exchange coupling with the magnetization pinned layer 53. The antiferromagnetic layer 52 is formed of an antiferromagnetic material such as IrMn or PtMn.

The magnetization direction of the magnetization pinned layer 53 is pinned by exchange coupling between the antiferromagnetic layer 52 and the magnetization pinned layer 53 at the interface therebetween. In the example shown in FIG. 7, the magnetization pinned layer 53 includes an outer layer 531, a nonmagnetic intermediate layer 532 and an inner layer 533 stacked in this order on the antiferromagnetic layer 52, and is thus formed as a so-called synthetic pinned layer. The outer layer 531 and the inner layer 533 are each formed of a soft magnetic material such as CoFe, CoFeB or CoNiFe. The magnetization direction of the outer layer 531 is pinned by exchange coupling between the outer layer 531 and the antiferromagnetic layer 52. The outer layer 531 and the inner layer 533 are antiferromagnetically coupled to each other, and their magnetizations are thus pinned in mutually opposite directions. The nonmagnetic intermediate layer 532 induces antiferromagnetic exchange coupling between the outer layer 531 and the inner layer 533 so as to pin the magnetizations of the outer layer 531 and the inner layer 533 in mutually opposite directions. The nonmagnetic intermediate layer 532 is formed of a nonmagnetic material such as Ru. Where the magnetization pinned layer 53 includes the outer layer 531, the nonmagnetic intermediate layer 532 and the inner layer 533, the magnetization direction of the magnetization pinned layer 53 refers to that of the inner layer 533.

Where the MR element 50 is a TMR element, the nonmagnetic layer 54 is a tunnel barrier layer. The tunnel barrier layer may be formed by oxidizing a part or the whole of a magnesium layer. Where the MR element 50 is a GMR element, the nonmagnetic layer 54 is a nonmagnetic conductive layer. The free layer 55 is formed of, for example, a soft magnetic material such as CoFe, CoFeB, NiFe, or CoNiFe. The protective layer 56 is provided for protecting the layers located thereunder. The protective layer 56 may be formed of Ta, Ru, W, or Ti, for example.

The underlayer 51 is connected to the lower electrode, and the protective layer 56 is connected to the upper electrode. The MR element 50 is configured to be supplied with a current through the lower electrode and the upper electrode. The current is passed in a direction intersecting the plane of the layers constituting the MR element 50, such as the direction perpendicular to the plane of the layers constituting the MR element 50.

Figure 8:
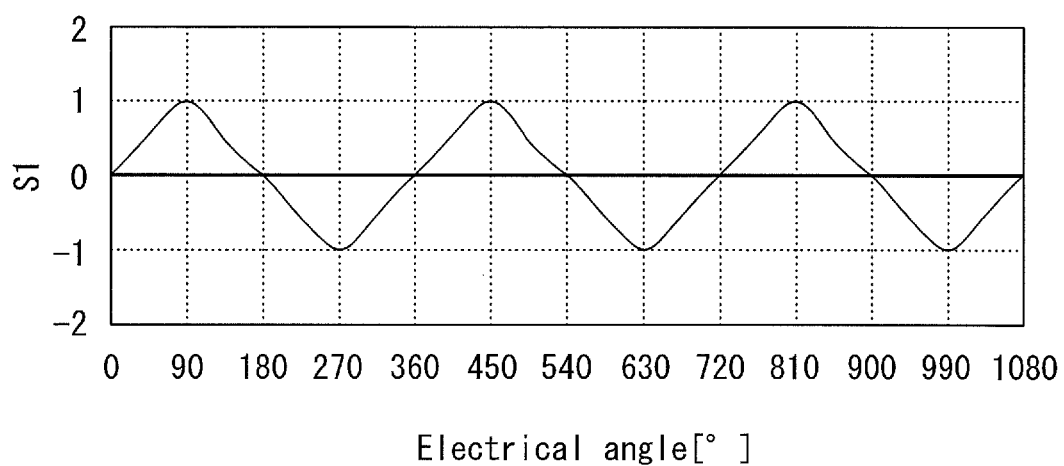
FIG. 8 is a waveform diagram illustrating a first detection signal of the first embodiment of the invention.

The first to third detection signals S1 to S3 will now be described with reference to FIG. 8. FIG. 8 is a waveform diagram illustrating the first detection signal S1. In FIG. 8, the horizontal axis represents the electrical angle of the first detection signal S1, while the vertical axis represents the potential of the first detection signal S1. Note that in FIG. 8, the first detection signal S1 is normalized so as to have a maximum value of 1 and a minimum value of −1. As shown in FIG. 8, the first detection signal S1 changes periodically. In the example shown in FIG. 8, the first detection signal S1 has a waveform distorted from a sinusoidal curve.

Although not illustrated, each of the second and third detection signals S2 and S3 has a waveform like that of the first detection signal S1 shown in FIG. 8. As previously mentioned, the phase difference of the third detection signal S3 with respect to the first detection signal S1 is 90°, and the phase difference of the second detection signal S2 with respect to the third detection signal S3 is 90°.

Here, the rotation of the rotating body or the magnet 5 in a counterclockwise direction in FIG. 2 will be referred to as the forward rotation, and that in a clockwise direction in FIG. 2 will be referred to as the reverse rotation. During the forward rotation, the phase of the third detection signal S3 is delayed by 90° with respect to the phase of the first detection signal S1 and advanced by 90° with respect to the phase of the second detection signal S2. During the reverse rotation, the phase of the third detection signal S3 is advanced by 90° with respect to the phase of the first detection signal S1 and delayed by 90° with respect to the phase of the second detection signal S2.

Now, a description will be given concerning the computations by the computing circuits 41 and 42 and the data processing circuit 43, and concerning the first and second post-computation signals. The computing circuit 41 generates, as the first post-computation signal Sa, a value obtained by normalizing the difference (S1−S3) between the first detection signal S1 and the third detection signal S3, for example. The computing circuit 42 generates, as the second post-computation signal Sb, a value obtained by normalizing the difference (S2−S3) between the second detection signal S2 and the third detection signal S3, for example.

Figure 9:
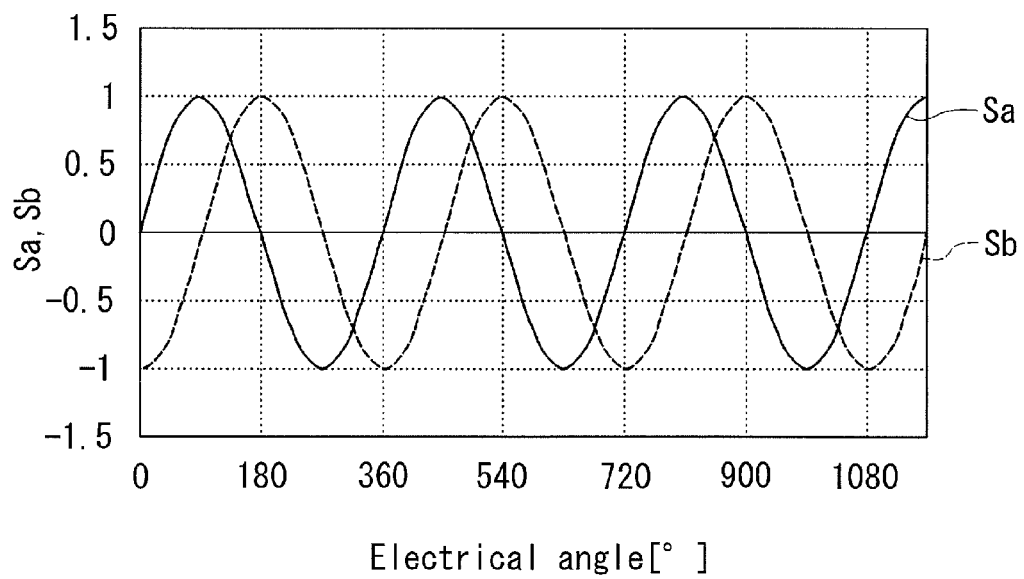
FIG. 9 is a waveform diagram illustrating first and second post-computation signals during the forward rotation in the first embodiment of the invention.

FIG. 9 is a waveform diagram illustrating the first and second post-computation signals Sa and Sb during the forward rotation. In FIG. 9, the horizontal axis represents a given electrical angle corresponding to the electrical angle of each of the first to third detection signals S1 to S3, while the vertical axis represents the potential of the first and second post-computation signals. A change in the electrical angle on the horizontal axis of FIG. 9 corresponds to a change in the relative positional relationship between the scale 1 and the magnetic sensor 2. In the example shown in FIG. 9, the first and second post-computation signals Sa and Sb are each normalized so as to have a maximum value of 1 and a minimum value of −1.

In the first embodiment, the third detection signal S3 is used for both the computation for generating the first post-computation signal Sa and the computation for generating the second post-computation signal Sb. Note that the first or second detection signal S1 or S2 may be used in place of the third detection signal S3 for both the computation for generating the first post-computation signal Sa and the computation for generating the second post-computation signal Sb.

As shown in FIG. 9, the first and second post-computation signals Sa and Sb change periodically in response to a change in the electrical angle on the horizontal axis of FIG. 9, that is, in response to a change in the relative positional relationship between the scale 1 and the magnetic sensor 2, and have mutually different phases. During the forward rotation, the phase of the second post-computation signal Sb is delayed by 90° with respect to the phase of the first post-computation signal Sa.

The data processing circuit 43 binary-codes the first and second post-computation signals Sa and Sb, which are output signals from the computing circuits 41 and 42, respectively. Hereinafter, a signal obtained by binary-coding the first post-computation signal Sa will be referred to as the first binary-coded signal DSa, and a signal obtained by binary-coding the second post-computation signal Sb will be referred to as the second binary-coded signal DSb.

Figure 10:
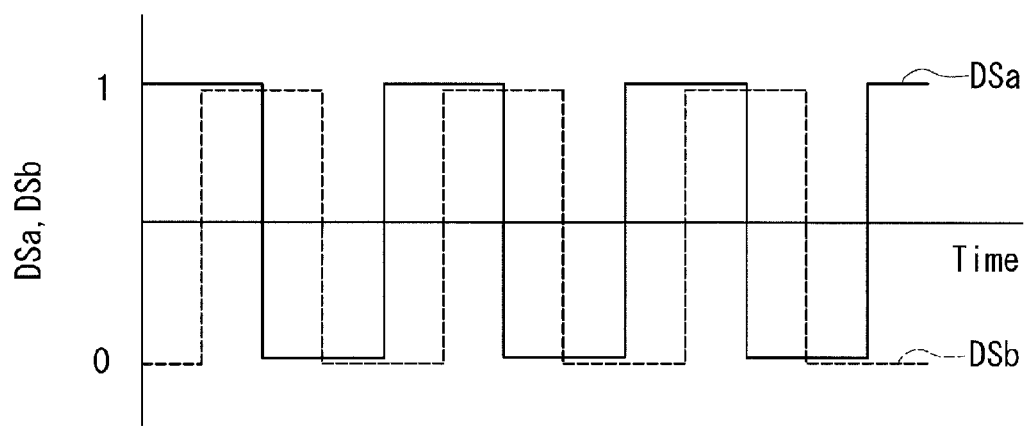
FIG. 10 is a waveform diagram illustrating first and second binary-coded signals during the forward rotation in the first embodiment of the invention.

FIG. 10 is a waveform diagram illustrating the binary-coded signals DSa and DSb obtained by binary-coding the post-computation signals Sa and Sb during the forward rotation shown in FIG. 9. In FIG. 10, the horizontal axis represents time and the vertical axis represents the value of the binary-coded signals DSa and DSb. In the example shown in FIG. 9 and FIG. 10, the value of the binary-coded signals DSa and DSb is 1 when the potential of the post-computation signals Sa and Sb is 0 or greater, and the value of the binary-coded signals DSa and DSb is 0 when the potential of the post-computation signals Sa and Sb is less than 0. In FIG. 10, for ease of understanding, the waveforms of the binary-coded signals DSa and DSb are illustrated as being offset from each other in the vertical direction of FIG. 10. Any figures similar to FIG. 10, to be referred to for descriptions below, will also employ the same way of representation as in FIG. 10. During the forward rotation, the phase of the second binary-coded signal DSb is delayed by 90° with respect to the phase of the first binary-coded signal DSa. The data processing circuit 43 uses the binary-coded signals DSa and DSb to detect the direction of rotation of the magnet 5 and to determine the rotational position and/or the rotational speed of the magnet 5.

Figure 11:
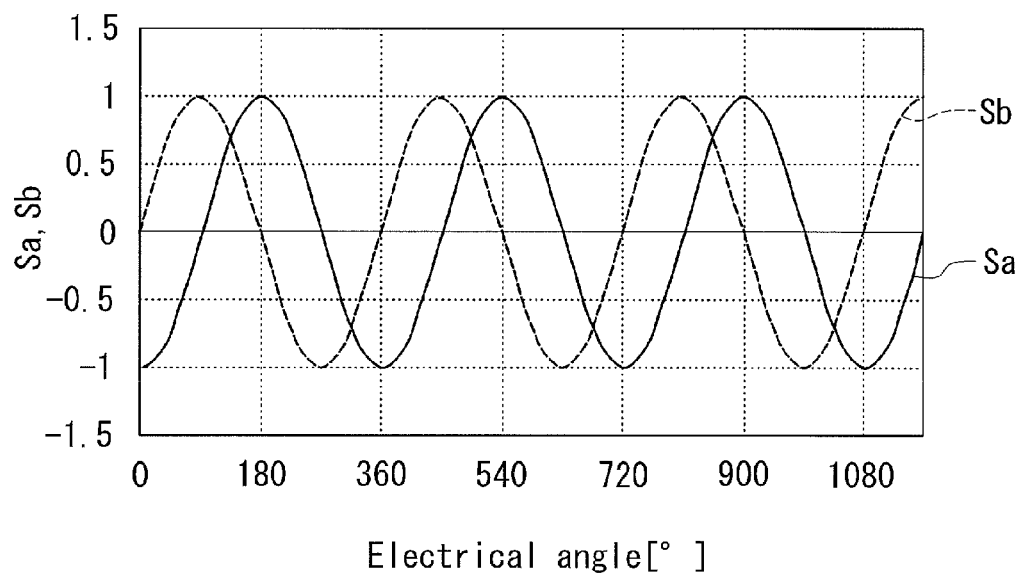
FIG. 11 is a waveform diagram illustrating the first and second post-computation signals during the reverse rotation in the first embodiment of the invention.
Figure 12:
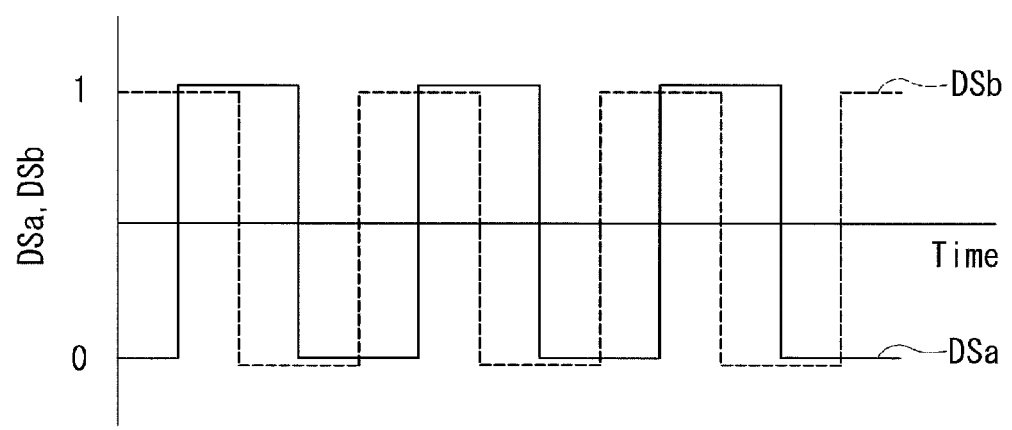
FIG. 12 is a waveform diagram illustrating the first and second binary-coded signals during the reverse rotation in the first embodiment of the invention.

Now, a method for detecting the direction of rotation of the magnet 5 using the first and second post-computation signals Sa and Sb and the first and second binary-coded signals DSa and DSb will be described with reference to FIG. 9 to FIG. 12. FIG. 11 is a waveform diagram illustrating the first and second post-computation signals Sa and Sb during the reverse rotation. FIG. 12 is a waveform diagram illustrating the first and second binary-coded signals DSa and DSb during the reverse rotation. FIG. 11 uses the same horizontal and vertical axes as those of FIG. 9. FIG. 12 uses the same horizontal and vertical axes as those of FIG. 10. As shown in FIG. 11, during the reverse rotation, the phase of the second post-computation signal Sb is advanced by 90° with respect to the phase of the first post-computation signal Sa, and the phase of the second binary-coded signal DSb is advanced by 90° with respect to the phase of the first binary-coded signal DSa.

The data processing circuit 43 detects the direction of relative movement of the scale 1 with respect to the magnetic sensor 2, that is, the direction of rotation of the magnet 5, on the basis of whether the phase of the second binary-coded signal DSb is advanced or delayed with respect to the phase of the first binary-coded signal DSa. More specifically, as shown in FIG. 10, if the phase of the second binary-coded signal DSb is delayed with respect to the phase of the first binary-coded signal DSa by the forward rotation of the magnet 5, the value of the second binary-coded signal DSb is 0 when the value of the first binary-coded signal DSa rises from 0 to 1. On the other hand, as shown in FIG. 12, if the phase of the second binary-coded signal DSb is advanced with respect to the phase of the first binary-coded signal DSa by the reverse rotation of the magnet 5, the value of the second binary-coded signal DSb is 1 when the value of the first binary-coded signal DSa rises from 0 to 1. This difference allows the data processing circuit 43 to detect whether the magnet 5 is making the forward rotation or the reverse rotation.

The rotational position and/or the rotational speed of the magnet 5 can be determined by, for example, counting the number of times the first or second binary-coded signal DSa or DSb takes a value of 1 while detecting the direction of rotation of the magnet 5.

The effects of the magnetic sensor system according to the first embodiment will now be described. In the first embodiment, each of the first to third detection circuits 10, 20 and 30 includes spin-valve MR elements 50 which allow a significant reduction in footprint when compared with anisotropic magnetoresistive elements. The first embodiment thus makes it possible that, in the magnetic sensor system in which the relative positional relationship between the scale 1 and the magnetic sensor 2 is changeable by two pitches or more, the first to third detection circuits 10, 20 and 30 are disposed such that the positional difference between the two positions P1 and P2 which are the most distant from each other in the first direction D1 among the first to third positions P1 to P3 falls within one pitch. By disposing the first to third detection circuits 10, 20 and 30 in such close proximity to each other, it is possible to prevent the first to third detection circuits 10, 20 and 30 from being subjected to mutually different noise magnetic fields, and to prevent the physical distances from the scale 1 to the first to third detection circuits 10, 20 and 30 from significantly differing from each other. It is also possible to prevent the effective distances from the scale 1 to the first to third detection circuits 10, 20 and 30 from significantly differing from each other due to, for example, adhesion of magnetic metal powder to the scale 1. In such a manner, the first embodiment makes it possible to prevent the first to third detection circuits 10, 20 and 30 from having mutually different detection characteristics.

Further, in the first embodiment, the first post-computation signal Sa is generated by computation using at least the first detection signal S1 and the third detection signal S3, and the second-post computation signal Sb is generated by computation using at least the second detection signal S2 and the third detection signal S3. Thus, in the first embodiment, the third detection signal S3 is used for both the computation for generating the first post-computation signal Sa and the computation for generating the second post-computation signal Sb. In the first embodiment, the first to third detection circuits 10, 20 and 30 are disposed in close proximity to each other. Thus, when unwanted variation components are superimposed on the first to third detection signals S1 to S3 due to, for example, variations in the distance between the scale 1 and the magnetic sensor 2 or a noise magnetic field applied to the magnetic sensor 2, the variation components of the first to third detection signals S1 to S3 are nearly in phase with each other. Accordingly, by generating the first and second post-computation signals Sa and Sb in the manner described above, it is possible to obtain the first and second post-computation signals Sa and Sb with reduced unwanted variation components. Consequently, the first embodiment makes it possible to accurately detect, by using the first and second post-computation signals Sa and Sb, a physical quantity associated with the relative positional relationship between the scale 1 and the magnetic sensor 2, including the direction of relative movement of the scale 1 with respect to the magnetic sensor 2. In the first embodiment, in particular, the first post-computation signal Sa is generated by computation including determining the difference between the first detection signal S1 and the third detection signal S3, while the second post-computation signal Sb is generated by computation including determining the difference between the second detection signal S2 and the third detection signal S3. This allows the generated first and second post-computation signals Sa and Sb to include no or almost no unwanted variation components.

Consequently, the first embodiment makes it possible to accurately detect a physical quantity associated with the relative positional relationship between the scale 1 and the magnetic sensor 2, including the direction of relative movement of the scale 1 with respect to the magnetic sensor 2, for the magnetic sensor system in which the relative positional relationship between the scale 1 and the magnetic sensor 2 is changeable by two pitches or more.

Second Embodiment

Figure 13:
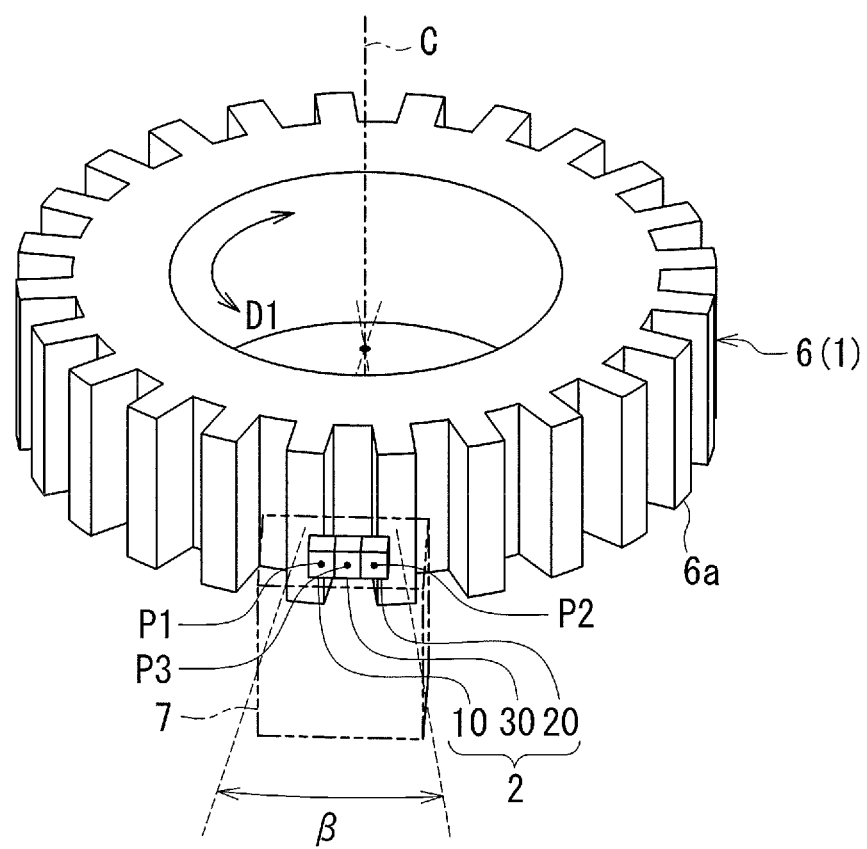
FIG. 13 is a perspective view illustrating the general configuration of a magnetic sensor system according to a second embodiment of the invention.
Figure 14:
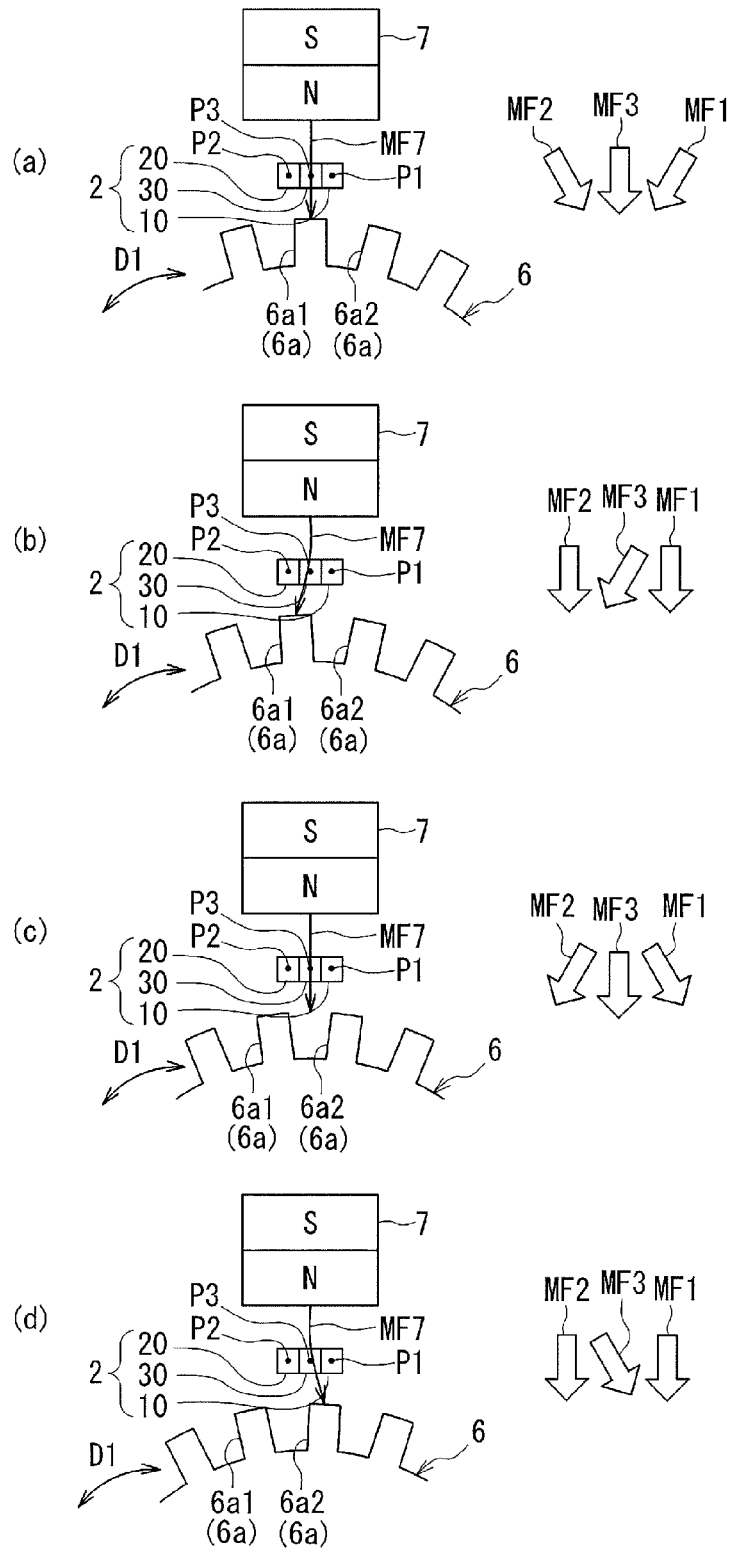
FIG. 14 is an explanatory diagram illustrating the operation of the magnetic sensor system according to the second embodiment of the invention.

A second embodiment of the invention will now be described with reference to FIG. 13 and FIG. 14. FIG. 13 is a perspective view illustrating the general configuration of a magnetic sensor system according to the second embodiment. FIG. 14 is an explanatory diagram illustrating the operation of the magnetic sensor system according to the second embodiment.

The configuration of the magnetic sensor system according to the second embodiment differs from that of the magnetic sensor system according to the first embodiment in the following ways. In the magnetic sensor system according to the second embodiment, the scale 1 is a rotating body that rotates about a predetermined central axis C as with the first embodiment; however, the rotating body of the second embodiment is a gear 6 having teeth 6a formed of a magnetic material. The magnetic sensor 2 is disposed to face the outer circumferential surface of the gear 6.

The magnetic sensor system according to the second embodiment includes a magnet 7 having a fixed positional relationship with the magnetic sensor 2. FIG. 13 and FIG. 14 show an example in which the magnet 7 is disposed with the magnetic sensor 2 between the magnet 7 and the gear 6. The N pole of the magnet 7 faces toward the gear 6. In FIG. 14 the arrows labeled MF7 indicate a magnetic flux produced from the magnet 7.

The first detection circuit 10 of the magnetic sensor 2 is disposed at a first position P1 and detects a first magnetic field MF1 applied to the first detection circuit 10. The second detection circuit 20 of the magnetic sensor 2 is disposed at a second position P2 and detects a second magnetic field MF2 applied to the second detection circuit 20. The third detection circuit 30 of the magnetic sensor 2 is disposed at a third position P3 and detects a third magnetic field MF3 applied to the third detection circuit 30.

In the second embodiment, each of the first to third magnetic fields MF1 to MF3 is produced by the magnet 7 and changes its direction as the gear 6 rotates. In FIG. 14, the hollow arrows MF1, MF2 and MF3 indicate the directions of the first magnetic field MF1, the second magnetic field MF2 and the third magnetic field MF3, respectively. The directions of the first, second and third magnetic fields MF1, MF2 and MF3 correspond to the directions of the magnetic flux MF7 when passing through the first, second and third detection circuits 10, 20 and 30, respectively.

As has been described in the first embodiment section, one pitch is the amount of a change in the relative positional relationship between the scale 1 and the magnetic sensor 2 that changes the direction of each of the first to third magnetic fields MF1 to MF3 by one period. In the second embodiment, one pitch is expressed in an angle in the direction of rotation of the rotating body or the gear 6. Specifically, one pitch is the angle formed by two straight lines that connect the central axis C to the centers of two adjacent teeth 6a of the gear 6. In FIG. 13, the aforementioned two straight lines are shown in broken lines and the angle formed by the two straight lines is denoted by symbol β. In the example shown in FIG. 13, the angle β is 15°. In this example, one rotation of the gear 6 causes the direction of each of the first to third magnetic fields MF1 to MF3 to change by 24 periods, and causes the relative positional relationship between the scale 1 and the magnetic sensor 2 to change by 24 pitches. One period of the first to third detection signals S1 to S3, i.e., an electrical angle of 360°, is equivalent to a ¹⁄₂₄ rotation of the gear 6, i.e., a 15-degree angle of rotation of the gear 6.

As shown in FIG. 13, the positional difference dp1 between the first osition P1 and the third position P3 and the positional difference dp2 between the second position P2 and the third position P3 are both ¼ of the angle 13, that is, ¼ pitch. Two of the first to third positions P1 to P3 that are the most distant from each other in the first direction D1 are the first position P1 and the second position P2. The positional difference between the first position P1 and the second position P2 in the first direction D1 is ½ of the angle β, that is, ½ pitch.

Portions (a), (b), (c) and (d) of FIG. 14 illustrate four relative positional relationships between the scale 1 and the magnetic sensor 2. Portion (a) illustrates a state in which the center of one of the teeth 6a of the gear 6 is located closest to the magnet 7. Portion (b) illustrates a state in which the gear 6 has rotated by 3° in a counterclockwise direction from the state shown in portion (a). Portion (c) illustrates a state in which the gear 6 has rotated by 4.5° in a counterclockwise direction from the state shown in portion (b), and particularly a state in which the gear 6 has rotated by ½ pitch (7.5°) in a counterclockwise direction from the state shown in portion (a). Portion (d) illustrates a state in which the gear 6 has rotated by 4.5° in a counterclockwise direction from the state shown in portion (c).

Each of the first to third magnetic fields MF1 to MF3 changes its direction in the following manner as the gear 6 rotates. Here, attention is focused on two adjacent teeth 6a1 and 6a2 of the gear 6. When in the states shown in portions (a) and (b) of FIG. 14, the distance between the tooth 6a1 and the magnet 7 is smaller than the distance between the tooth 6a2 and the magnet 7. When in the state shown in portion (c) of FIG. 14, the distance between the tooth 6a1 and the magnet 7 is equal to the distance between the tooth 6a2 and the magnet 7. When in the state shown in portion (d) of FIG. 14, the distance between the tooth 6a2 and the magnet 7 is smaller than the distance between the tooth 6a1 and the magnet 7.

Direction of the first magnetic field MF1 will be described first. First, when in the state shown in portion (a) of FIG. 14, the first magnetic field MF1 is oriented in the direction from the first position P1 to the tooth 6a1, that is, in the down-leftward direction in FIG. 14. Then, when the gear 6 rotates into the state shown in portion (b) of FIG. 14, the first magnetic field MF1 is oriented in the direction from the first position P1 to the midpoint between the tooth 6a1 and the tooth 6a2, that is, in substantially the downward direction in FIG. 14. Then, when the gear 6 rotates into the state shown in portion (c) of FIG. 14, the first magnetic field MF1 is oriented in the direction from the first position P1 to the tooth 6a2, that is, in the down-rightward direction in FIG. 14. Then, when the gear 6 rotates into the state shown in portion (d) of FIG. 14, the first magnetic field MF1 is oriented in the direction from the first position P1 to the tooth 6a2, that is, in substantially the downward direction in FIG. 14.

Direction of the second magnetic field MF2 will now be described. First, when in the state shown in portion (a) of FIG. 14, the second magnetic field MF2 is oriented in the direction from the second position P2 to the tooth 6a1, that is, in the down-rightward direction in FIG. 14. Then, when the gear 6 rotates into the state shown in portion (b) of FIG. 14, the second magnetic field MF2 is oriented in the direction from the second position P2 to the tooth 6a1, that is, in substantially the downward direction in FIG. 14. Then, when the gear 6 rotates into the state shown in portion (c) of FIG. 14, the second magnetic field MF2 is oriented in the direction from the second position P2 to the tooth 6a1, that is, in the down-leftward direction in FIG. 14. Then, when the gear 6 rotates into the state shown in portion (d) of FIG. 14, the second magnetic field MF2 is oriented in the direction from the second position P2 to the midpoint between the tooth 6a1 and the tooth 6a2, that is, in substantially the downward direction in FIG. 14.

Direction of the third magnetic field MF3 will now be described. First, when in the state shown in portion (a) of FIG. 14, the third magnetic field MF3 is oriented in the direction from the third position P3 to the tooth 6a1, that is, in the downward direction in FIG. 14. Then, when the gear 6 rotates into the state shown in portion (b) of FIG. 14, the third magnetic field MF3 is oriented in the direction from the third position P3 to the tooth 6a1, that is, in the down-leftward direction in FIG. 14. Then, when the gear 6 rotates into the state shown in portion (c) of FIG. 14, the third magnetic field MF3 is oriented in the direction from the third position P3 to the midpoint between the tooth 6a1 and the tooth 6a2, that is, in the downward direction in FIG. 14. Then, when the gear 6 rotates into the state shown in portion (d) of FIG. 14, the third magnetic field MF3 is oriented in the direction from the third position P3 to the tooth 6a2, that is, in the down-rightward direction in FIG. 14.

In such a manner, each of the first to third magnetic fields MF1 to MF3 changes its direction as the gear 6 rotates. In the example shown in FIG. 14, the direction of the first magnetic field MF1 changes periodically from the down-leftward direction to the downward direction, then to the down-rightward direction, and then to the downward direction in this order. The direction of the second magnetic field MF2 changes periodically from the down-rightward direction to the downward direction, then to the down-leftward direction, and then to the downward direction in this order. The direction of the third magnetic field MF3 changes periodically from the downward direction to the down-leftward direction, then to the downward direction, and then to the down-rightward direction in this order.

The first detection circuit 10 detects, for example, the strength of a component of the first magnetic field MF1 in the horizontal direction in FIG. 14 and outputs a first detection signal indicative of the strength. The second detection circuit 20 detects, for example, the strength of a component of the second magnetic field MF2 in the horizontal direction in FIG. 14 and outputs a second detection signal indicative of the strength. The third detection circuit 30 detects, for example, the strength of a component of the third magnetic field MF3 in the horizontal direction in FIG. 14 and outputs a third detection signal indicative of the strength. The third detection signal has a phase difference of 90° with respect to the first detection signal. The second detection signal has a phase difference of 90° with respect to the third detection signal. The second detection signal has a phase difference of 180° with respect to the first detection signal.

The remainder of configuration, function and effects of the second embodiment are similar to those of the first embodiment.

Third Embodiment

Figure 15:
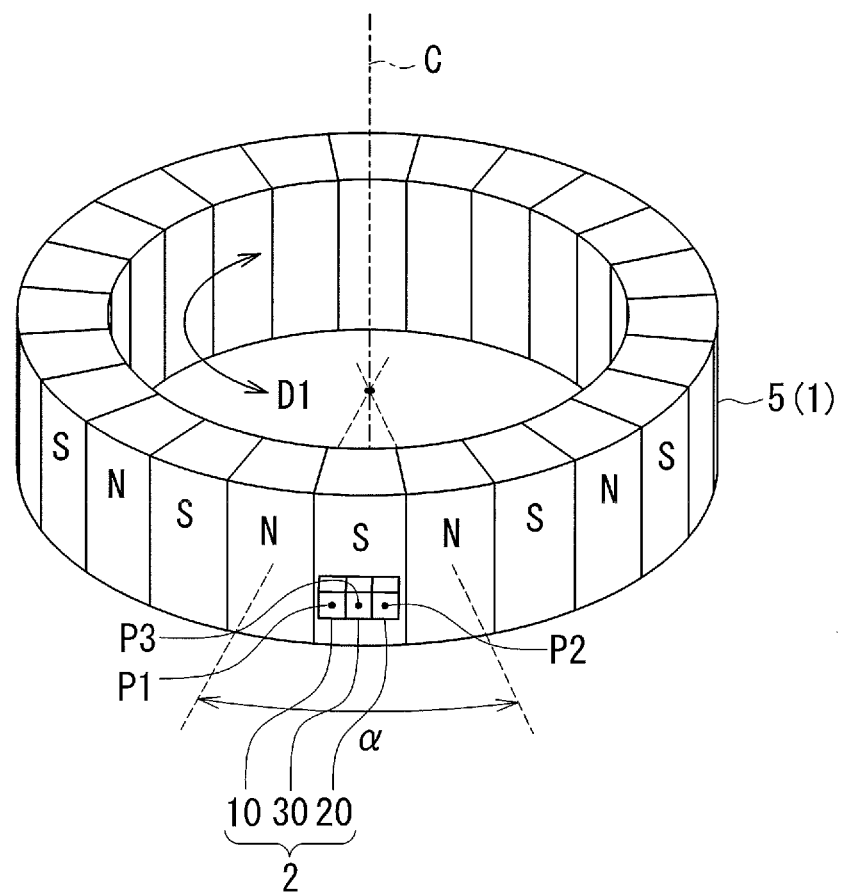
FIG. 15 is a perspective view illustrating the general configuration of a magnetic sensor system according to a third embodiment of the invention.
Figure 16:
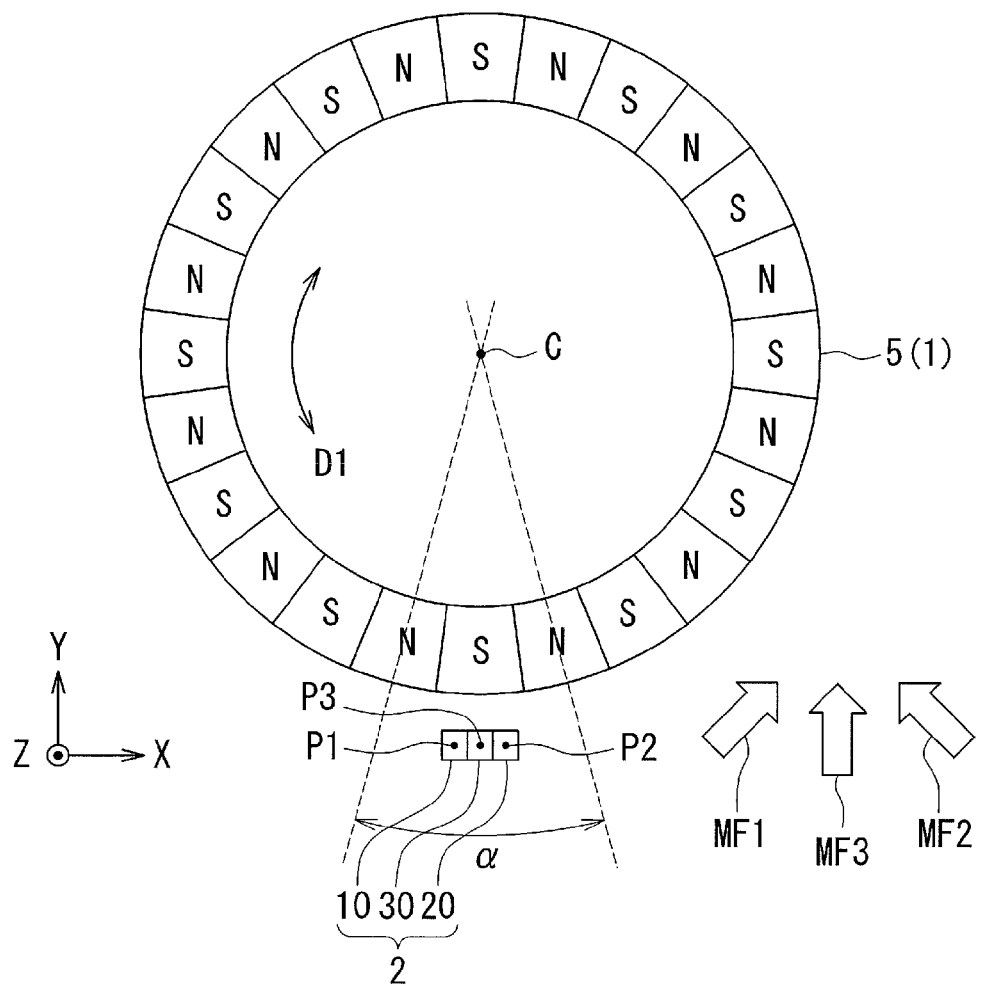
FIG. 16 is a plan view illustrating the general configuration of the magnetic sensor system according to the third embodiment of the invention.
Figure 17:
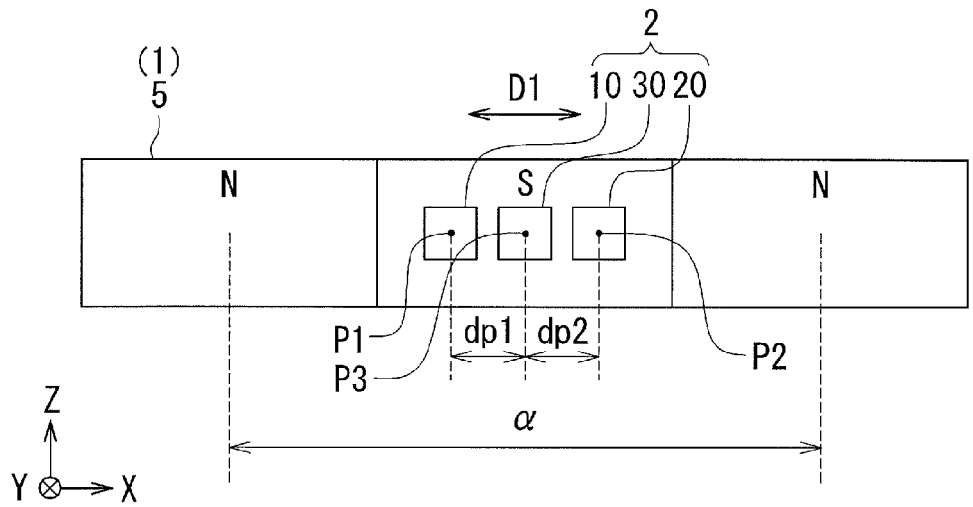
FIG. 17 is a side view illustrating a scale and first to third detection circuits of the third embodiment of the invention.

A third embodiment of the invention will now be described. First, the configuration of a magnetic sensor system according to the third embodiment will be described with reference to FIG. 15 to FIG. 17. FIG. 15 is a perspective view illustrating the general configuration of the magnetic sensor system according to the third embodiment. FIG. 16 is a plan view illustrating the general configuration of the magnetic sensor system according to the third embodiment. FIG. 17 is a side view illustrating the scale and the first to third detection circuits of the third embodiment.

The configuration of the magnetic sensor system according to the third embodiment differs from that of the magnetic sensor system according to the first embodiment in the following ways. In the third embodiment, as shown in FIG. 15 to FIG. 17, the positional difference dp1 between the first position P1 and the third position P3, the positional difference dp2 between the second position P2 and the third position P3, and the positional difference between the first position P1 and the second position P2 are different from those of the first embodiment. In the third embodiment, the positional differences dp1 and dp2 are both ⅛ of the angle α, that is, ⅛ pitch. Two of the first to third positions P1 to P3 that are the most distant from each other in the first direction D1 are the first position P1 and the second position P2. The positional difference between the first position P1 and the second position P2 in the first direction D1 is ¼ of the angle α, that is, ¼ pitch.

The third detection signal S3 has a phase difference of 45° with respect to the first detection signal S1. The second detection signal S2 has a phase difference of 45° with respect to the third detection signal S3. The second detection signal S2 has a phase difference of 90° with respect to the first detection signal S1.

Figure 18:
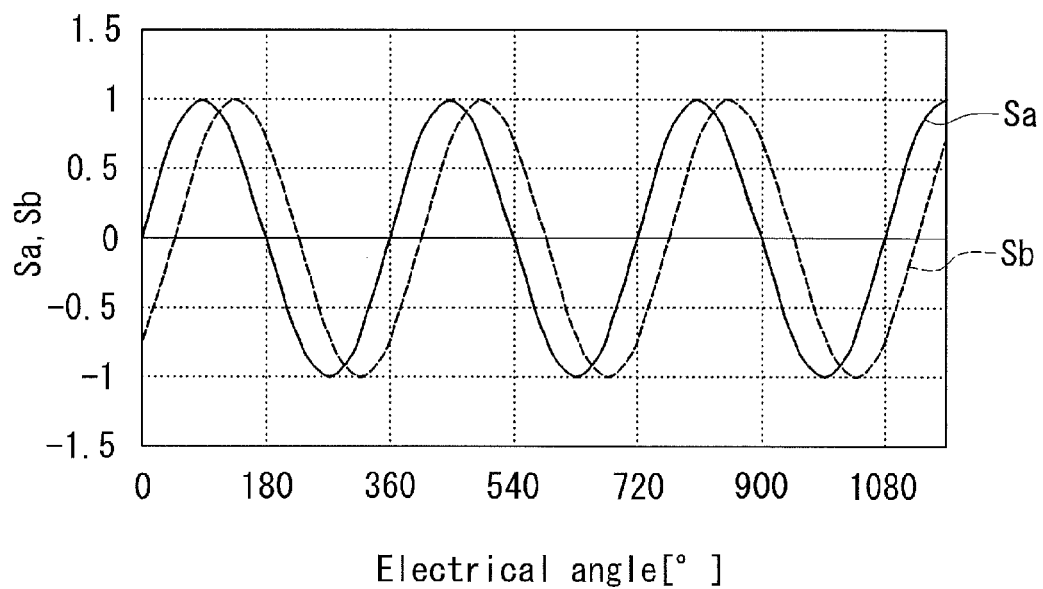
FIG. 18 is a waveform diagram illustrating first and second post-computation signals during the forward rotation in the third embodiment of the invention.
Figure 19:
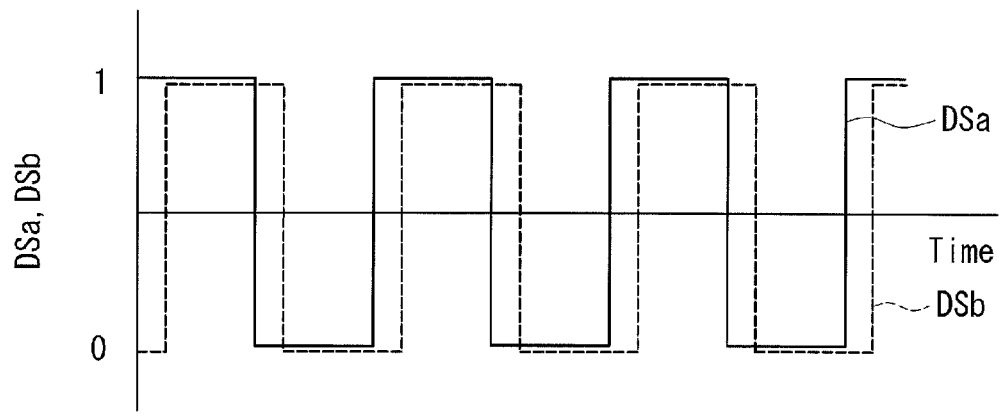
FIG. 19 is a waveform diagram illustrating first and second binary-coded signals during the forward rotation in the third embodiment of the invention.
Figure 20:
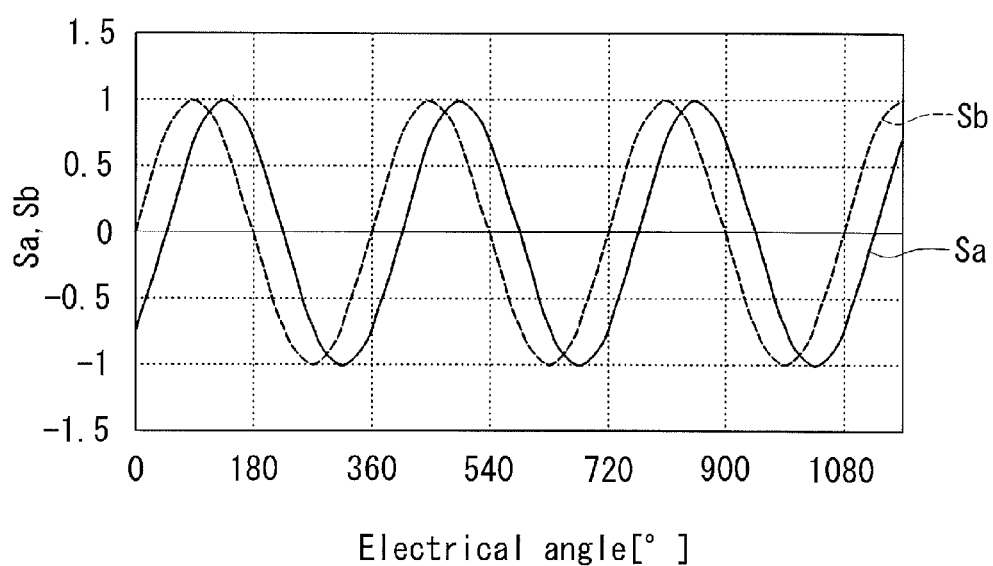
FIG. 20 is a waveform diagram illustrating the first and second post-computation signals during the reverse rotation in the third embodiment of the invention.
Figures 21, 22:
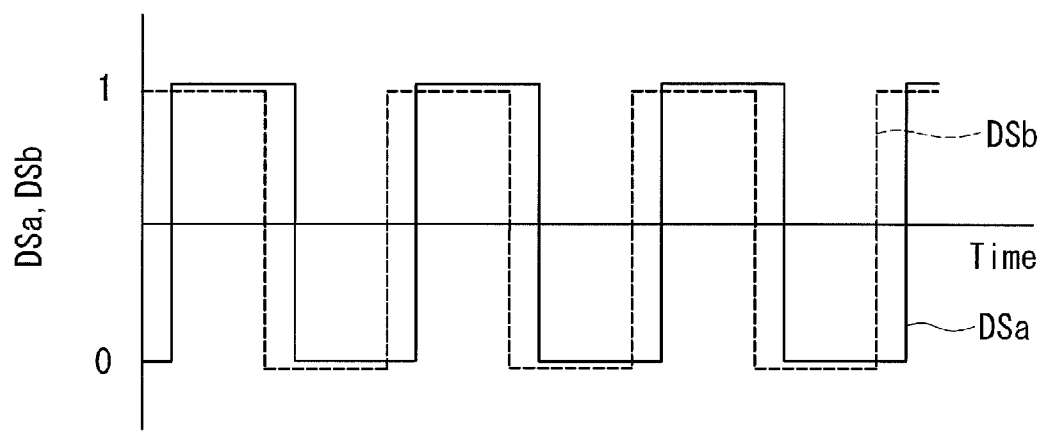
FIG. 21 is a waveform diagram illustrating the first and second binary-coded signals during the reverse rotation in the third embodiment of the invention.
FIG. 22 is a perspective view illustrating the general configuration of a magnetic sensor system according to a fourth embodiment of the invention.

The first and second post-computation signals of the third embodiment will now be described with reference to FIG. 18 to FIG. 21. FIG. 18 is a waveform diagram illustrating the first and second post-computation signals Sa and Sb during the forward rotation. FIG. 19 is a waveform diagram illustrating the first and second binary-coded signals DSa and DSb during the forward rotation. FIG. 20 is a waveform diagram illustrating the first and second post-computation signals Sa and Sb during the reverse rotation. FIG. 21 is a waveform diagram illustrating the first and second binary-coded signals DSa and DSb during the reverse rotation. FIG. 18 to FIG. 21 use the same horizontal and vertical axes as those of FIG. 9 to FIG. 12, respectively. The post-computation signals Sa and Sb and the binary-coded signals DSa and DSb are generated in the same manner as the first embodiment.

During the forward rotation, as shown in FIG. 18 and FIG. 19, the phase of the second post-computation signal Sb is delayed by 45° with respect to the phase of the first post-computation signal Sa, and the phase of the second binary-coded signal DSb is delayed by 45° with respect to the phase of the first binary-coded signal DSa. During the reverse rotation, as shown in FIG. 20 and FIG. 21, the phase of the second post-computation signal Sb is advanced by 45° with respect to the phase of the first post-computation signal Sa, and the phase of the second binary-coded signal DSb is advanced by 45° with respect to the phase of the first binary-coded signal DSa. In the third embodiment, the use of the first and second binary-coded signals DSa and DSb makes it possible to detect the direction of rotation of the magnet 5 and to determine the rotational position and/or the rotational speed of the magnet 5, as with the first embodiment.

In the third embodiment, the first to third positions P1 to P3 are closer to each other than in the first embodiment. Thus, the effects described in the first embodiment section are more remarkable in the third embodiment.

The rotating body of the third embodiment may be the gear 6 described in the second embodiment section. The remainder of configuration, function and effects of the third embodiment are similar to those of the first or second embodiment.

Fourth Embodiment

A fourth embodiment of the invention will now be described with reference to FIG. 22. FIG. 22 is a perspective view illustrating the general configuration of a magnetic sensor system according to the fourth embodiment. The magnetic sensor system according to the fourth embodiment differs from that according to the first embodiment in the following ways. In the magnetic sensor system according to the fourth embodiment, the scale 1 is a linear scale 8 having a plurality of pairs of N and S poles arranged alternately in a linear configuration. In the example shown in FIG. 22, the linear scale 8 has a side surface 8a parallel to the direction in which the N and S poles are arranged. The magnetic sensor 2 is disposed to face the side surface 8a of the linear scale 8.

One of the linear scale 8 and the magnetic sensor 2 moves linearly in response to the movement of a moving object (not illustrated). This changes the relative positional relationship between the scale 1 and the magnetic sensor 2. The magnetic sensor system detects the relative position and/or speed of the linear scale 8 with respect to the magnetic sensor 2 as the physical quantity associated with the relative positional relationship between the scale 1 and the magnetic sensor 2. The first direction D1, in which the relative positional relationship between the scale 1 and the magnetic sensor 2 varies, is the direction in which the N and S poles of the linear scale 8 are arranged.

The first detection circuit 10 of the magnetic sensor 2 is disposed at a first position P1 and detects a first magnetic field applied to the first detection circuit 10. The second detection circuit 20 of the magnetic sensor 2 is disposed at a second position P2 and detects a second magnetic field applied to the second detection circuit 20. The third detection circuit 30 of the magnetic sensor 2 is disposed at a third position P3 and detects a third magnetic field applied to the third detection circuit 30. The first to third positions P1 to P3 are different from each other in the first direction D1. In the example shown in FIG. 22, the first to third positions P1 to P3 are arranged in the order of the first position P1, the third position P3 and the second position P2 from the left in FIG. 22. In the present invention, however, the order of arrangement of the positions P1 to P3 is not limited to this example. The first to third positions P1 to P3 are the same in a direction orthogonal to the side surface 8a and in the vertical direction in FIG. 22.

In the fourth embodiment, each of the first to third magnetic fields is produced by the linear scale 8 and changes its direction in response to a change in the relative positional relationship between the linear scale 8 and the magnetic sensor 2. Although not illustrated, the direction of the first magnetic field rotates about the first position P1 in a plane perpendicular to the side surface 8a and parallel to the first direction D1. The direction of the second magnetic field rotates about the second position P2 in the plane perpendicular to the side surface 8a and parallel to the first direction D1. The direction of the third magnetic field rotates about the third position P3 in the plane perpendicular to the side surface 8a and parallel to the first direction D1.

As has been described in the first embodiment section, one pitch is the amount of a change in the relative positional relationship between the scale 1 and the magnetic sensor 2 that changes the direction of each of the first to third magnetic fields by one period. In the fourth embodiment, one pitch is the distance L between the centers of two adjacent N poles of the linear scale 8.

In the fourth embodiment, the positional difference between any two of the first to third positions P1 to P3 in the first direction D1 is defined by the distance between the two positions in the first direction D1. The positional differences dp1 between the first position P1 and the third position P3 and the positional difference dp2 between the second position P2 and the third position P3 are both ¼ of the distance L, that is, ¼ pitch. Two of the first to third positions P1 to P3 that are the most distant from each other in the first direction D1 are the first position P1 and the second position P2. The positional difference between the first position P1 and the second position P2 in the first direction D1 is ½ of the distance L, that is, ½ pitch.

Each of the first to third detection circuits 10, 20 and 30 includes the MR elements 50 described in the first embodiment section (see FIG. 7). The first to third detection circuits 10, 20 and 30 are disposed such that the plane of the layers constituting the MR elements 50 included therein is parallel to the side surface 8a of the linear scale 8.

The first to third detection circuits 10, 20 and 30 of the fourth embodiment may be configured in the same manner as the example shown in FIG. 5 described in the first embodiment section. In this case, the first to third detection circuits 10, 20 and 30 may be disposed such that the first direction D1 of the fourth embodiment is parallel to the X direction shown in FIG. 5 and that the direction orthogonal to the side surface 8a of the linear scale 8 is parallel to the Y direction shown in FIG. 5.

Further, as in the third embodiment, both the positional differences dp1 and dp2 may be ⅛ of the distance L, that is, ⅛ pitch. In this case, the positional difference between the first position P1 and the second position P2 is ¼ of the distance L, that is, ¼ pitch. The remainder of configuration, function and effects of the fourth embodiment are similar to those of the first or third embodiment.

The present invention is not limited to the foregoing embodiments, and various modifications may be made thereto. For example, the contents of computation for generating the first post-computation signal Sa and the contents of computation for generating the second post-computation signal Sb are not limited to the examples illustrated in the foregoing embodiments, but may be modified as desired as far as the requirements of the appended claims are met. At least one of the first and second post-computation signals Sa and Sb may be generated by computation using the first to third detection signals S1 to S3. For example, the first post-computation signal Sa may be generated by computation including $S1-(S2+S3)/\sqrt{2}$, and the second post-computation signal Sb may be generated by computation including $S2-(S1+S3)\sqrt{2}$.

It is apparent that the present invention can be carried out in various forms and modifications in the light of the foregoing descriptions. Accordingly, within the scope of the following claims and equivalents thereof, the present invention can be carried out in forms other than the foregoing most preferable embodiments.

What is claimed is:

1. A magnetic sensor system comprising a scale and a magnetic sensor that are arranged in a relative positional relationship variable in a first direction, the magnetic sensor system being configured to detect a physical quantity associated with the relative positional relationship between the scale and the magnetic sensor, wherein
    the magnetic sensor includes a first detection circuit disposed at a first position, a second detection circuit disposed at a second position, and a third detection circuit disposed at a third position,
    the first detection circuit outputs a first detection signal that varies depending on a first magnetic field applied to the first detection circuit,
    the second detection circuit outputs a second detection signal that varies depending on a second magnetic field applied to the second detection circuit,
    the third detection circuit outputs a third detection signal that varies depending on a third magnetic field applied to the third detection circuit,
    each of the first to third detection circuits includes a magnetoresistive element,
    the magnetoresistive element includes: a magnetization pinned layer having a magnetization in a pinned direction; a free layer having a magnetization that varies depending on an applied magnetic field; and a nonmagnetic layer interposed between the magnetization pinned layer and the free layer,
    each of the first to third magnetic fields changes its direction periodically in response to a change in the relative positional relationship between the scale and the magnetic sensor,
    the relative positional relationship between the scale and the magnetic sensor is changeable by two pitches or more, where one pitch is an amount of a change in the relative positional relationship between the scale and the magnetic sensor that changes the direction of each of the first to third magnetic fields by one period,
    two of the first to third positions that are the most distant from each other in the first direction are different from each other by one pitch or less in the first direction,
    the first to third detection signals change periodically in response to a change in the relative positional relationship between the scale and the magnetic sensor, and have mutually different phases,
    the magnetic sensor system further comprises a computing unit that generates a first post-computation signal by computation using at least the first detection signal and the third detection signal and generates a second post-computation signal by computation using at least the second detection signal and the third detection signal, and
    the first post-computation signal and the second post-computation signal change periodically in response to a change in the relative positional relationship between the scale and the magnetic sensor, and have mutually different phases.

2. The magnetic sensor system according to claim 1, wherein two of the first to third positions that are the most distant from each other in the first direction are different from each other by ½ pitch or less in the first direction.

3. The magnetic sensor system according to claim 1, wherein the first post-computation signal is generated by computation including determining a difference between the first detection signal and the third detection signal, and the second post-computation signal is generated by computation including determining a difference between the second detection signal and the third detection signal.

4. The magnetic sensor system according to claim 1, wherein
    the scale is a rotating body that rotates about a predetermined central axis,
    the rotation of the rotating body changes the relative positional relationship between the scale and the magnetic sensor,
    the first direction is a direction of rotation of the rotating body, and
    the one pitch is expressed in an angle in the direction of rotation of the rotating body.

5. The magnetic sensor system according to claim 4, wherein
    the rotating body has a plurality of pairs of N and S poles alternately arranged in a circumferential direction,
    each of the first to third magnetic fields is produced by the rotating body and changes its direction as the rotating body rotates, and
    the one pitch is an angle formed by two straight lines that connect the central axis to centers of two adjacent N poles of the rotating body.

6. The magnetic sensor system according to claim 4, wherein
    the rotating body is a gear having teeth formed of a magnetic material, the magnetic sensor system further comprises a magnet having a fixed positional relationship with the magnetic sensor, each of the first to third magnetic fields is produced by the magnet and changes its direction as the gear rotates, and the one pitch is an angle formed by two straight lines that connect the central axis to centers of two adjacent teeth.

7. The magnetic sensor system according to claim 1, wherein the scale has a plurality of pairs of N and S poles arranged alternately in a linear configuration, the first direction is a direction in which the N and S poles of the scale are arranged, each of the first to third magnetic fields is produced by the scale, and the one pitch is a distance between centers of two adjacent N poles of the scale.

8. The magnetic sensor system according to claim 1, wherein the nonmagnetic layer is a tunnel barrier layer.

* * * * *